(12) United States Patent
Kashibuchi

(10) Patent No.: US 9,247,105 B2
(45) Date of Patent: Jan. 26, 2016

(54) IMAGE FORMING APPARATUS AND IMAGE FORMING METHOD THEREFOR

(75) Inventor: Yoichi Kashibuchi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 451 days.

(21) Appl. No.: 13/291,813

(22) Filed: Nov. 8, 2011

(65) Prior Publication Data

US 2012/0147431 A1    Jun. 14, 2012

(30) Foreign Application Priority Data

Dec. 10, 2010    (JP) ................................ 2010-276388

(51) Int. Cl.
*H04N 1/409*    (2006.01)
*H04N 1/407*    (2006.01)

(52) U.S. Cl.
CPC .................................. *H04N 1/4092* (2013.01)

(58) Field of Classification Search
USPC .................. 358/3.27, 2.1, 1.9, 3.01
See application file for complete search history.

(56) References Cited

U.S. PATENT DOCUMENTS

| | | | | |
|---|---|---|---|---|
| 5,323,247 A * | 6/1994 | Parker et al. | ................. | 358/3.08 |
| 5,760,346 A | 6/1998 | Kobayashi et al. | | |
| 5,761,087 A | 6/1998 | Yoshimura et al. | | |
| 5,862,049 A | 1/1999 | Sato et al. | | |
| 6,044,204 A | 3/2000 | Takamatsu et al. | | |
| 6,225,986 B1 | 5/2001 | Sato et al. | | |
| 6,239,792 B1 | 5/2001 | Yanagisawa et al. | | |
| 6,288,711 B1 | 9/2001 | Tanaka et al. | | |
| 6,611,258 B1 | 8/2003 | Tanaka et al. | | |
| 6,771,793 B1 * | 8/2004 | Yamada | ........................ | 382/264 |
| 7,706,021 B2 | 4/2010 | Kaburagi | | |
| 7,881,524 B2 | 2/2011 | Matsugu et al. | | |
| 7,912,253 B2 | 3/2011 | Suzuki et al. | | |
| 7,982,913 B2 | 7/2011 | Kaburagi | | |
| 7,995,805 B2 | 8/2011 | Suzuki et al. | | |
| 2004/0114815 A1 * | 6/2004 | Shibaki et al. | ................. | 382/233 |
| 2005/0280852 A1 * | 12/2005 | Namizuka | ..................... | 358/1.9 |
| 2006/0092475 A1 * | 5/2006 | Kaburagi | .................... | 358/3.27 |
| 2006/0115157 A1 | 6/2006 | Mori et al. | | |
| 2007/0273927 A1 * | 11/2007 | Misaizu et al. | ................. | 358/2.1 |
| 2008/0278736 A1 * | 11/2008 | Kawashima et al. | .......... | 358/1.9 |
| 2009/0089235 A1 | 4/2009 | Torii et al. | | |

(Continued)

FOREIGN PATENT DOCUMENTS

| | | |
|---|---|---|
| JP | 10-42141 A | 2/1998 |
| JP | 10-065919 A | 3/1998 |

(Continued)

OTHER PUBLICATIONS

U.S. Appl. No. 13/290,722, filed Nov. 7, 2011, Applicant: Yoichi Kashibuchi.

Japanese Office Action dated Nov. 19, 2012 in Japanese Application No. 2010-276388.

*Primary Examiner* — Quang N Vo

(74) *Attorney, Agent, or Firm* — Fitzpatrick, Cella, Harper & Scinto

(57) ABSTRACT

An image forming apparatus detects an edge in image data and performs density correction so as to reduce the density of the detected edge. The apparatus then performs screen processing on the image data including the edge that has undergone the density correction, and performs smoothing processing on the edge in screen data obtained through the screen processing.

8 Claims, 25 Drawing Sheets

(56) References Cited

U.S. PATENT DOCUMENTS

2009/0324060 A1 12/2009 Sato et al.
2010/0149567 A1* 6/2010 Kanazawa et al. ............. 358/1.9
2010/0171999 A1 7/2010 Namikata et al.
2011/0158540 A1 6/2011 Suzuki et al.
2011/0179052 A1 7/2011 Sato

FOREIGN PATENT DOCUMENTS

| | | |
|---|---|---|
| JP | 2006-295877 A | 10/2006 |
| JP | 2007-312013 A | 11/2007 |
| JP | 2009-253645 A | 10/2009 |
| JP | 2010-192962 A | 9/2010 |

* cited by examiner

FIG. 9

F I G. 10
: 0
: 1
: 2

FIG. 11
 : 0
 : 1
 : 2

IMAGE FORMING APPARATUS AND IMAGE FORMING METHOD THEREFOR

BACKGROUND OF THE INVENTION

1. Field of the Invention

The present invention relates to an image forming apparatus for reducing jaggies on edges in image data that has undergone halftone processing, and an image forming method therefor.

2. Description of the Related Art

Conventionally, several techniques for reducing jagged edges, called "jaggies", occurring around edges of characters or the like in an image forming apparatus have been proposed. There are various reasons as to why jaggies occur, and it can be thought that there are roughly two types of jagged edges, namely, jagged edges of pixels due to a low-resolution printer and jagged edges due to halftone processing such as screen processing.

As one example of a technique for reducing the former, there is a technique for detecting edges from a binary image through pattern matching and adding or removing pixels to or from places where pixels match, corresponding to the pattern (see Japanese Patent Laid-Open No. 10-42141, for example). With this technique, smoothing processing is performed on edges by detecting places where jaggies occur through pattern matching and dividing a single pixel into multiple pixels in the case of a binary printer and adding halftone dots in the case of a multi-value printer.

Also, one example of a technique for reducing the latter is a technique for generating correction data from image data prior to halftone processing and adding the correction data to edges in the image data that has undergone halftone processing such that the edges are rimmed with the correction data (see Japanese Patent Laid-Open No. 2006-295877, for example). This technique reduces jaggies due to screen processing by determining whether or not each pixel is an edge pixel that requires smoothing processing, and if the pixel is an edge pixel, comparing the correction data and the image data that has undergone halftone processing and outputting the one with the greater value. With this technique, the former jagged edges of pixels due to a low-resolution printer can also be reduced, irrespective of a simple configuration.

However, although jaggies due to screen processing can be reduced with the above-described conventional method, the density of edges ends up simply increasing because, out of the correction data and the image data that has undergone halftone processing, the one with the greater value is output for edges. This phenomenon is not a great problem with original documents in which characters, lines or the like have regular edges at a uniform density, but it can cause image interference, such as a great change in coloration, with original documents such as a natural image that include irregularly packed edges.

SUMMARY OF THE INVENTION

The present invention provides an apparatus and a method that suppress an increase in the density of edges due to smoothing processing.

According to one aspect of the present invention provides, there is provided an image forming apparatus comprising: a detection unit that detects an edge in image data; a density correction unit that performs density correction so as to reduce a density of the edge detected by the detection unit; a screen processing unit that performs screen processing on the image data including the edge that has undergone the density correction performed by the density correction unit; and a smoothing processing unit that performs smoothing processing on the edge in screen data obtained through the screen processing performed by the screen processing unit.

Further features of the present invention will become apparent from the following description of exemplary embodiments with reference to the attached drawings.

BRIEF DESCRIPTION OF THE DRAWINGS

FIG. 9 is a diagram showing examples of edge patterns.

FIG. 10 is a diagram showing examples of edge patterns.

FIG. 11 is a diagram showing examples of line patterns.

FIG. 12 is a diagram showing examples of line patterns.

FIG. 16 is a diagram showing examples of rendering patterns.

FIG. 17 is a diagram showing examples of rendering patterns.

DESCRIPTION OF THE EMBODIMENTS

Below is a detailed description of embodiments for carrying out the present invention, with reference to the drawings. Although a digital multifunction peripheral having multiple functions such as copying, printing, and faxing is taken as an example of an image forming apparatus in the description of the present embodiment, it is needless to say that the present invention is not limited thereto.

Figure 1:
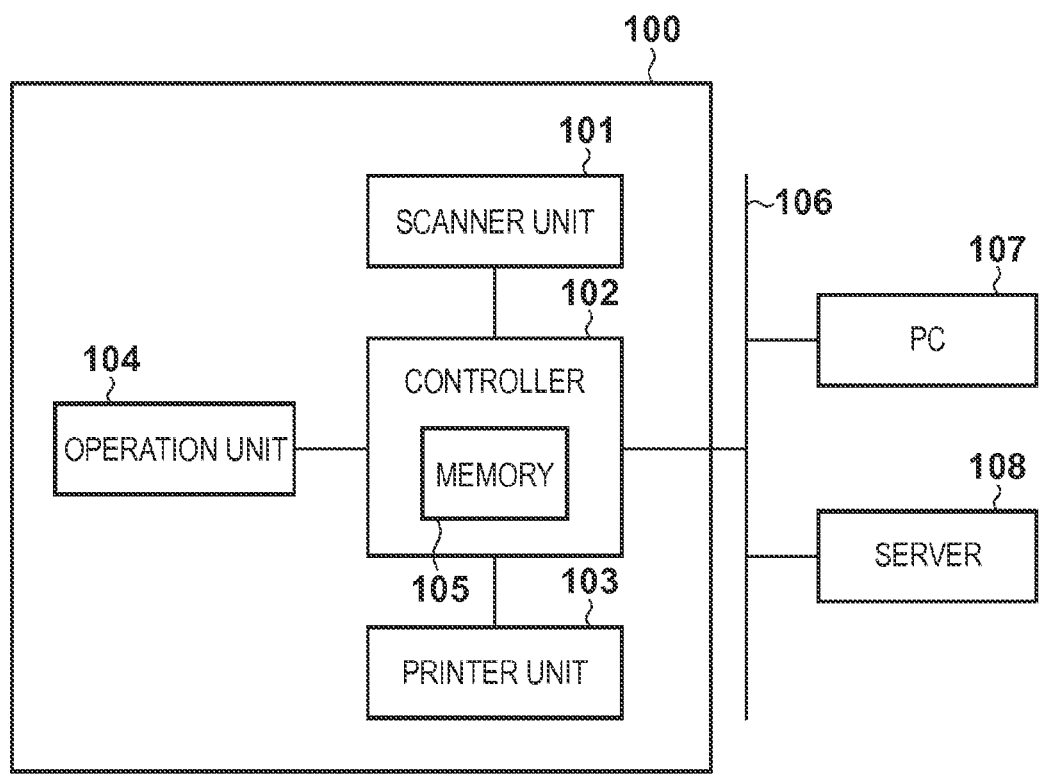
FIG. 1 is a schematic block diagram showing a configuration of an image forming apparatus 100 according to an embodiment of the present invention.

FIG. 1 is a schematic block diagram showing a configuration of an image forming apparatus 100 according to the present embodiment. The image forming apparatus 100 includes a scanner unit 101 that performs reading processing for optically reading an image of an original document and outputting the image as image data, and a controller 102 that performs image processing on the image data read by the scanner unit 101 and stores the processed image data in a memory 105. The image forming apparatus 100 further includes an operation unit 104 that sets various printing conditions for the image data read by the scanner unit 101. The apparatus also includes a printer unit 103 that forms an image by visualizing the image data read out from the memory 105 on a recording sheet in accordance with the printing conditions set by the operation unit 104.

The image forming apparatus 100 is connected to, for example, a server 108 that manages image data via a network 106, and a personal computer (PC) 107 that instructs the image forming apparatus 100 to execute printing. Upon receiving an instruction to execute printing from the server 108 or the PC 107, the controller 102 rasterizes print data transmitted from the server 108 or the PC 107 into image data and stores the rasterized image data in the memory 105.

Figure 2:
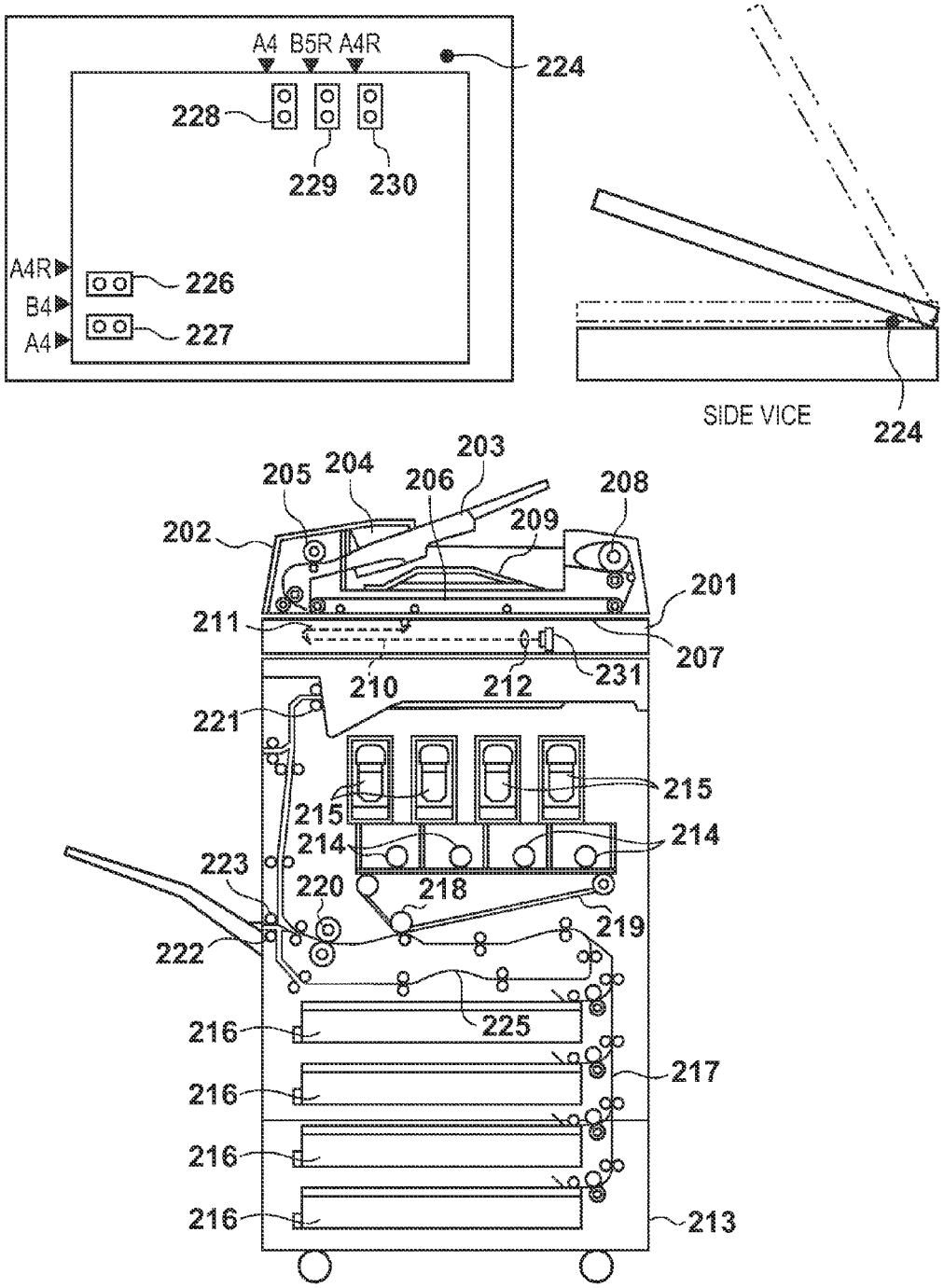
FIG. 2 is a cross-sectional view showing a detailed configuration of the image forming apparatus 100.

Next, a detailed configuration of the image forming apparatus 100 shown in FIG. 1 will be described with reference to a cross-sectional view shown in FIG. 2. The image forming apparatus 100 has copying, printing, and faxing functions. In FIG. 2, the image forming apparatus 100 includes the scanner unit 101, a document feeder (DF) 202, and the printer unit 103 for printing and recording provided with four color drums.

First, a reading operation for copying, performed primarily by the scanner unit 101, will be described. In the case where reading is performed with an original document set on an original platen 207, a user sets an original document on the original platen 207 and closes the DF 202. When an open/close sensor 224 detects the closing of the original platen 207, then light-reflective type document size detection sensors 226 to 230 provided in the housing of the scanner unit 101 detect the size of the set original document. With this size detection as a start, a light source 210 illuminates the original document, and a charge-coupled device (CCD) 231 receives reflected light from the original document via a reflector 211 and a lens 212 and reads an image. Then, the controller 102 of the image forming apparatus 100 converts the data read by the CCD 231 into image data in the form of digital signals and stores the image data in the memory 105 of the controller 102 after performing image processing for scanner. Here, the image data is composed of pixels in the RGB color space with three color components, each pixel holding eight bits (256 gradations) for each color component.

Next is a description of a rasterization operation for printing, performed primarily by the controller 102. Print data such as page description language (PDL) data or a display list is transmitted from the PC 107 via the network 106. The print data is vector information and holds not only information such as color, shape, and coordinates for rendering, but also data indicating an attribute such as character, line, graphic, or image on an object-by-object basis.

Upon receiving the print data, the controller 102 performs rasterization based on the print data and generates image data and attribute data on a pixel-by-pixel basis. The print data has a color space with multiple color components, such as gray-scale, RGB, or CMYK, and each pixel in the image data holds eight bits (256 gradations) for each color component. The attribute data holds a value that represents the attribute of each object, such as character, line, graphic, or image, and is handled together with the image data in an image processing unit 301.

Next is a description of a printing operation for copying and printing, performed primarily by the printer unit 103. The image data and the attribute data that have been once stored in the memory 105 of the controller 102 are transferred to the printer unit 103 after again undergoing image processing for printing described later in the controller 102. In the printer unit 103, the image data and the attribute data are converted into pulse signals under PWM control of the printer unit 103, and then into recording laser light of four colors (cyan (C), magenta (M), yellow (Y), and black (K)) by a laser recording unit. The recording laser light is then emitted to photoconductors 214 of the respective colors, forming an electrostatic latent image on each of the photoconductors.

The printer unit 103 performs toner development on the respective photoconductors using toners supplied from toner cartridges 215, and toner images visualized on the respective photoconductors are primarily transferred to an intermediate transfer belt 219. In FIG. 2, the intermediate transfer belt 219 turns clockwise, and the toner images are transferred from the intermediate transfer belt 219 to a recording sheet supplied from a paper cassette 216 through a paper feed conveyance path 217 when the recording sheet has reached a secondary transfer position 218. After a fixing unit 220 fixes the toner by application of heat and pressure, the recording sheet on which the image has been transferred is conveyed through a discharge conveyance path and discharged face-down to a center tray 221 or face-up to a side tray 222.

Figure 3:
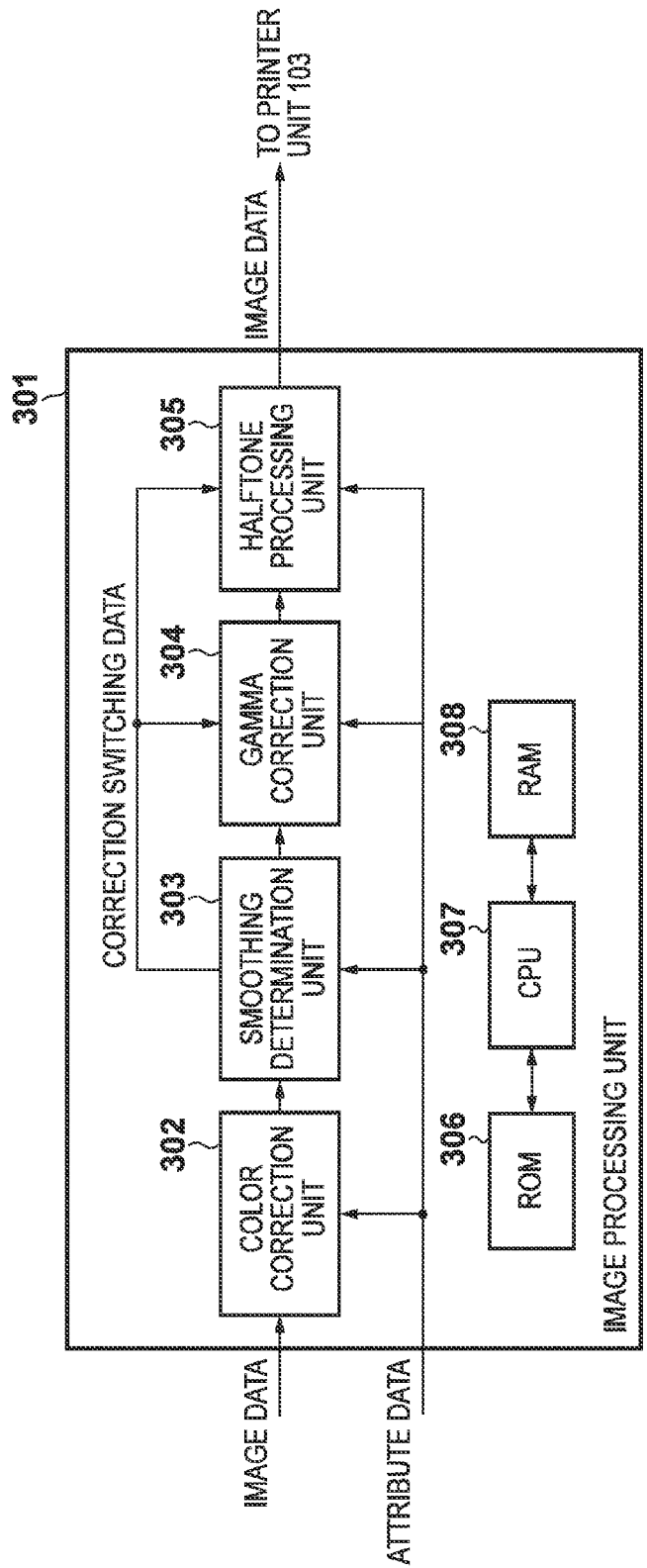
FIG. 3 is a diagram showing a configuration of an image processing unit for printing.

Next is a detailed description of the aforementioned image processing for printing, with reference to FIG. 3. The image processing unit 301 shown in FIG. 3 performs image processing for printing in the controller 102. A color correction unit 302 performs color correction processing on the image data, out of the image data and the attribute data input from the memory 105, so that the image data is converted into a CMYK color space with a density of four image signals, using a color conversion LUT or through a matrix operation. Each pixel in the converted image data holds eight bits for each image signal.

Then, a smoothing determination unit 303 performs edge correction processing described later and outputs the processed image data to a gamma correction unit 304 and correction switching data to the gamma correction unit 304 and a halftone processing unit 305. The correction switching data refers to data used to switch processing performed by the smoothing determination unit 303, the gamma correction unit 304, and the halftone processing unit 305, and each of the CMYK image signals is capable of holding a different value of the correction switching data. The correction switching data describes a smoothing type to be applied to each pixel in the image data, and a screen type to be used by the halftone processing unit 305.

The gamma correction unit 304 performs gamma correction processing on the input image data in accordance with the correction switching data, and outputs the image data that has undergone gamma correction processing to the halftone processing unit 305. The gamma correction processing involves correcting the input image data using a one-dimensional look-up table so that an image when transferred to the recording sheet has the desired density characteristic. One-dimensional look-up tables used in the correction are held for the respective screen types of the halftone processing unit 305, and are switched and used according to the screen type in the input correction switching data. If the screen type in the correction switching data is "skip", the input image data is directly output without applying any one-dimensional lookup tables.

The halftone processing unit 305 performs halftone processing, which will be described later, on the input image data in accordance with the correction switching data, and sends the processed image data to the printer unit 103. The halftone processing involves performing screen processing for converting the input image data into 4-bit image data that is printable by the printer unit 103, as well as performing second smoothing processing in order to reduce jaggies. A CPU 307 controls the overall processing performed by the image processing unit 301, based on a control program stored in a ROM 306. A RAM 308 is used as a work area of the CPU 307.

Figure 4:
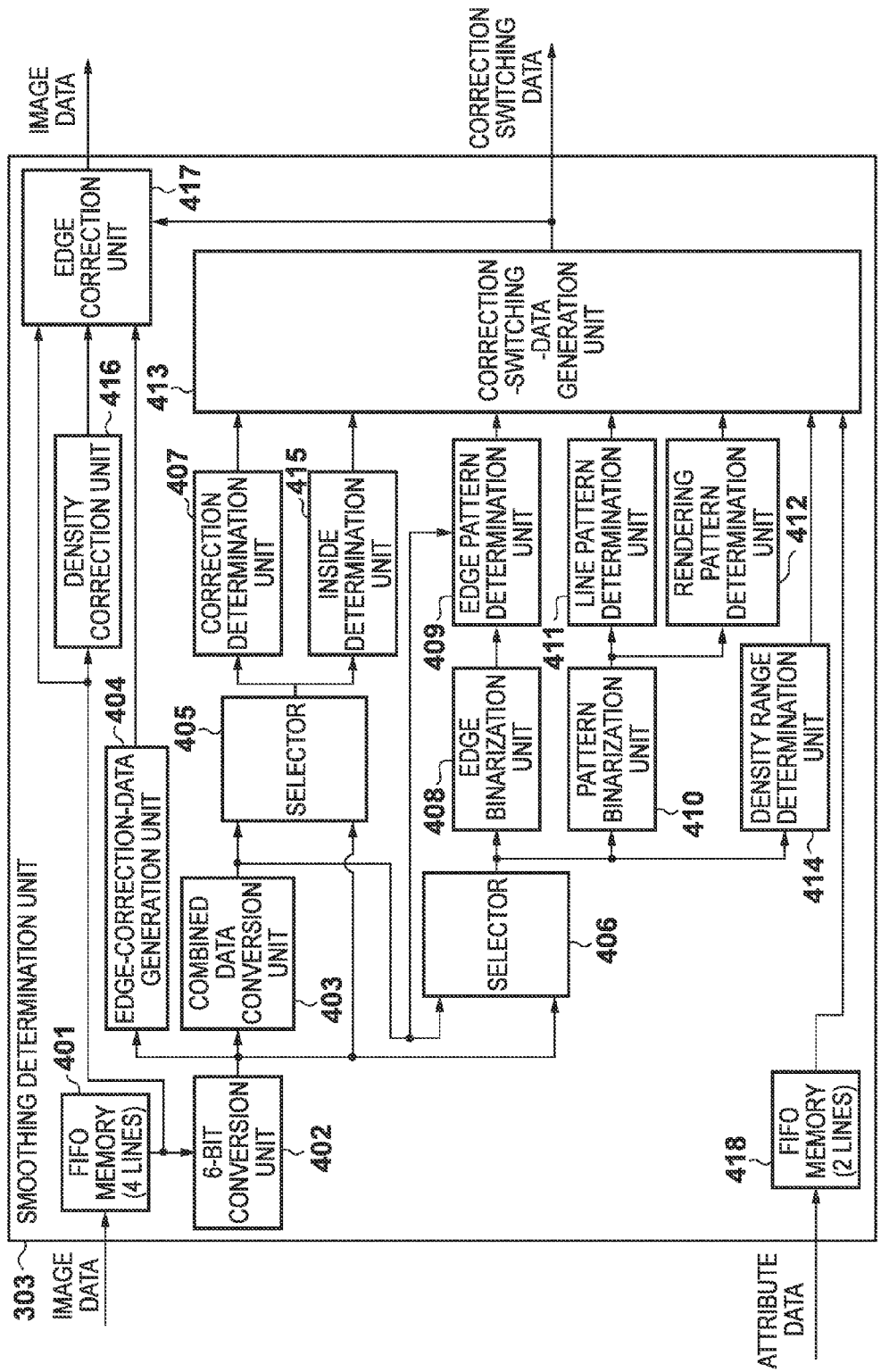
FIG. 4 is a diagram showing a configuration of a smoothing determination unit 303.

Next is a description of the configuration and operation of the smoothing determination unit 303, with reference to FIG. 4. Here, the smoothing determination unit 303 receives input of the image data converted into the CMYK color space and the attribute data, and outputs image data and correction switching data through the following processing performed on each piece of the CMYK image data.

First, the smoothing determination unit 303 accumulates the image data converted into the CMYK color space in an FIFO memory 401. The FIFO memory 401 delays the image data by four lines so as to form a reference area composed of 25 pixels, specifically, five pixels in width by five pixels in height with the center pixel serving as a pixel of interest, and outputs the reference area to a 6-bit conversion unit 402, a density correction unit 416, and an edge correction unit 417. Note that only a single pixel (pixel of interest) in the center of the reference area is output to the density correction unit 416 and the edge correction unit 417.

Meanwhile, like the image data converted into the CMYK color space, the attribute data is accumulated in an FIFO memory 418. The FIFO memory 418 delays the attribute data by two lines and outputs a single pixel's worth of data to a correction-switching-data generation unit 413 in synchronization with the timing of the pixel of interest in the reference area.

The 6-bit conversion unit 402 converts the pixel value of each of the 25 pixels in the reference area into six bits, and outputs the converted value to a combined data conversion unit 403, selectors 405 and 406, and an edge-correction-data generation unit 404. In this case, since each pixel in the reference area holds eight bits for each image signal, the two least significant bits are discarded. Then, the combined data conversion unit 403 performs combined data conversion processing for generating a reference rectangle in combined data, which will be described later, based on the reference area that has undergone 6-bit conversion, and outputs the result to the selectors 405 and 406 and an edge pattern determination unit 409. Note here that only a pixel in the center of the reference area, namely, a pixel of interest, is output to the edge pattern determination unit 409.

The selectors 405 and 406 each select one of the reference rectangle input from the 6-bit conversion unit 402 and the reference rectangle in the combined data input from the combined data conversion unit 403. The selector 405 outputs the selected reference rectangle to a correction determination unit 407 and an inside determination unit 415, and the selector 406 outputs the selected reference rectangle to an edge binarization unit 408, a pattern binarization unit 410, and a density range determination unit 414. Note that only a single pixel in the center of the reference area, namely, a pixel of interest, is output to the density range determination unit 414.

The correction determination unit 407 performs correction determination processing, which will be described later, for determining whether or not to perform smoothing processing, based on the reference area, and outputs the result as a correction determination signal to the correction-switching-data generation unit 413. The inside determination unit 415 performs inside determination processing for determining whether or not the pixel of interest is inside, based on the reference area, and outputs the result as an inside determination signal to the correction-switching-data generation unit 413. The inside determination processing involves obtaining a maximum value of the pixel values of a total of 9 pixels, specifically, three pixels in width by three pixels in height with the pixel of interest in the reference area as the center, and if the pixel value of the pixel of interest is greater than the maximum value, setting the inside determination signal to "inside", and otherwise setting the inside determination signal to "outside".

The edge binarization unit 408 performs binarization of the reference area by, for each of all the 25 pixels in the input reference area, comparing the pixel value and a predetermined threshold value. In the binarization, each pixel is set to 1 if the pixel value is greater than the threshold value, and to 0 if the pixel value is equal to or less than the threshold value. Then, the edge pattern determination unit 409 performs edge pattern determination processing, which will be described later, using the pixel of interest in the combined data, the binarized reference area, and edge correction data. The edge pattern determination processing involves outputting a first smoothing determination signal indicating whether or not to perform first smoothing processing, to the correction-switching-data generation unit 413.

The edge-correction-data generation unit 404 obtains edge correction data through edge-correction-data generation processing described later, and outputs the edge correction data to the edge correction unit 417. The pattern binarization unit 410 performs binarization of the reference area by, for each of all the 25 pixels in the input reference area, comparing the pixel value and a predetermined threshold value. In the binarization, each pixel is set to 1 if the pixel value is greater than the threshold value, and to 0 if the pixel value is equal to or less than the threshold value.

Then, a line pattern determination unit 411 performs line pattern determination processing, which will be described later, using the reference area binarized by the pattern binarization unit 410, and outputs a line correction determination signal indicating whether or not to perform line correction, to the correction-switching-data generation unit 413. Similarly, a rendering pattern determination unit 412 performs rendering pattern determination processing, which will be described later, using the binarized reference area, and outputs a rendering pattern correction determination signal indicating whether or not to perform rendering pattern correction to the correction-switching-data generation unit 413. The density range determination unit 414 determines a density range of the pixel of interest from the pixel of interest in the reference area selected by the selector 406, and outputs a density range determination signal indicating one of a high density range, a medium density range, and a low density range to the correction-switching-data generation unit 413. In this density range determination, the density range is set to a high density range if the pixel value of the pixel of interest is greater than a threshold value, and to a lower density range if the pixel value of the pixel of interest is less than the threshold value, and otherwise to a medium density range.

The correction-switching-data generation unit 413 performs correction-switching-data generation processing, which will be described later, using various types of input signals, and outputs correction switching data described later to the edge correction unit 417 and the gamma correction unit 304. The density correction unit 416 performs density correction processing using the pixel of interest in the center of the reference area output from the FIFO memory 401, and outputs the corrected pixel of interest to the edge correction unit 417. The density correction processing involves performing correction so as to reduce the density (pixel value) of the pixel of interest, using a one-dimensional look-up table with 8-bit input and 8-bit output.

The edge correction unit 417 performs edge correction processing described later, using the pixel of interest in the center of the reference area, the corrected pixel of interest described above, the edge correction data, and the correction switching data, and outputs the resultant image data to the gamma correction unit 304.

Figure 5:
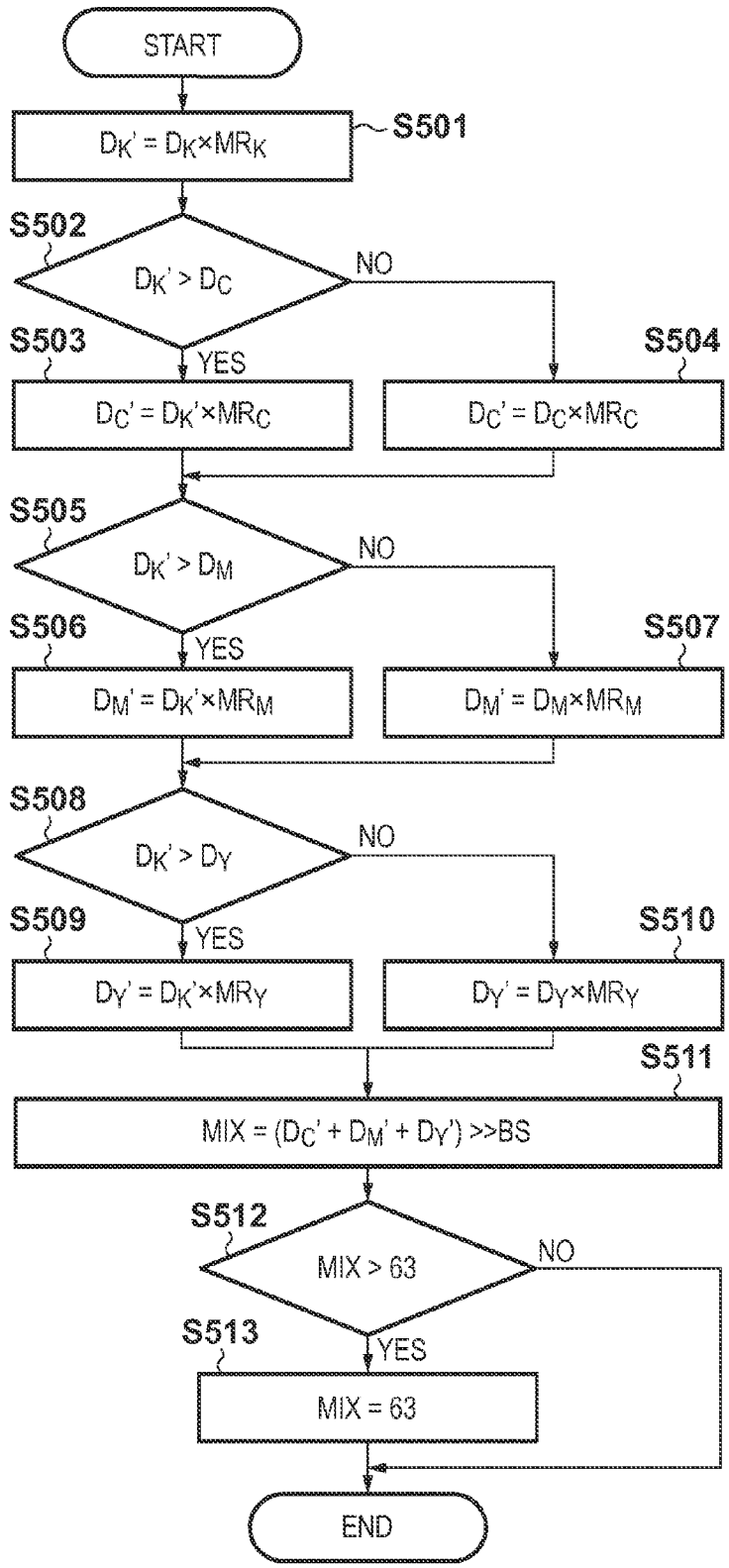
FIG. 5 is a flowchart showing combined data conversion processing.

Next is a detailed description of the combined data conversion processing performed by the combined data conversion unit 403 of the present embodiment, with reference to FIG. 5. The combined data conversion processing is processing, performed for each of all the 25 pixels constituting the reference area, for obtaining 6-bit combined data for each pixel through a combination of the CMYK image signals at a predetermined ratio, and generating a reference area composed of these 25 pixels.

First, in step S501, the combined data conversion unit 403 obtains a pixel value $D_K'$ of K from the product of a pixel value $D_K$ of K and a mixing ratio $MR_K$ of K. In this case, the mixing ratio $MR_K$ is an arbitrary value from 0 to 1. Whether the combined data is to be generated from only chromatic colors of CMY or from all colors including the achromatic color of K is determined depending on the mixing ratio $MR_K$.

Then, in step S502, the combined data conversion unit 403 determines whether or not the pixel value $D_K'$ is greater than a pixel value $D_C$ of C. The procedure proceeds to step S503 if the pixel value $D_K'$ is greater, and otherwise to step S504. In step S503, the combined data conversion unit 403 obtains a pixel value $D_C'$ of C by multiplying the pixel value $D_K'$ by a mixing ratio $MR_C$ of C. In step S504, the combined data conversion unit 403 obtains a pixel value $D_C'$ of C by multiplying the pixel value $D_C$ by the mixing ratio $MR_C$ of C. In this case, the mixing ratio $MR_C$ is an arbitrary value, and the ratio of C to the combined data to be generated can be controlled by varying the mixing ratio $MR_C$.

Then, in step S505, the combined data conversion unit 403 determines whether or not the pixel value $D_K'$ is greater than a pixel value $D_M$ of M. The procedure proceeds to step S506 if the pixel value $D_K'$ is greater, and otherwise to step S507. In step S506, the combined data conversion unit 403 obtains a pixel value $D_M'$ of M by multiplying the pixel value $D_K'$ by a mixing ratio $MR_M$ of M. In step S507, the combined data conversion unit 403 obtains a pixel value $D_M'$ of M by multiplying the pixel value $D_M$ of M by the mixing ratio $MR_M$ of M. In this case, the mixing ratio $MR_M$ is an arbitrary value, and the ratio of M to the combined data to be generated can be controlled by varying the mixing ratio $MR_M$.

Then, in step S508, the combined data conversion unit 403 determines whether or not the pixel value $D_K'$ is greater than a pixel value $D_Y$ of Y. The procedure proceeds to step S509 if the pixel value $D_K'$ is greater, and otherwise to step S510. In step S509, the combined data conversion unit 403 obtains a pixel value $D_Y'$ of Y by multiplying the pixel value $D_K'$ by a mixing ratio $MR_Y$ of Y. In step S510, the combined data conversion unit 403 obtains a pixel value $D_Y'$ of Y by multiplying the pixel value $D_Y$ by the mixing ratio $MRy$ of Y. In this case, the mixing ratio $MR_Y$ is an arbitrary value, and the ratio of Y to the combined data to be generated can be controlled by varying the mixing ratio $MR_Y$.

Then, in step S511, the combined data conversion unit 403 obtains combined data MIX for each pixel by shifting a total value of $D_C'$, $D_M'$, and $D_Y'$ obtained through the above processing to the right by an amount corresponding to the number of bits designated by a bit shift amount BS. Then, in step S512, the combined data conversion unit 403 determines whether or not the combined data MIX is greater than 63, which is a maximum value for six bits. If the combined data MIX is greater than 63, the combined data MIX is set to 63 in step S513.

By creating the combined data of four colors (CMYK) at an arbitrary ratio in this way and using the created data in subsequent processing, smoothing processing can be performed irrespective of colors to be processed. This makes it possible to suppress the occurrence of false colors around edges.

It is needless to say that a method for the combined data conversion processing is not limited to the method described in the present embodiment, as long as mixed data of multiple colors is used. Furthermore, although the total value of the respective products of the pixel values D of the respective image signals and the mixing ratios MR is shifted to the right by the bit shift amount BS in step S511, needless to say a division may be used instead of the shifting to the right, for example.

Figure 6:
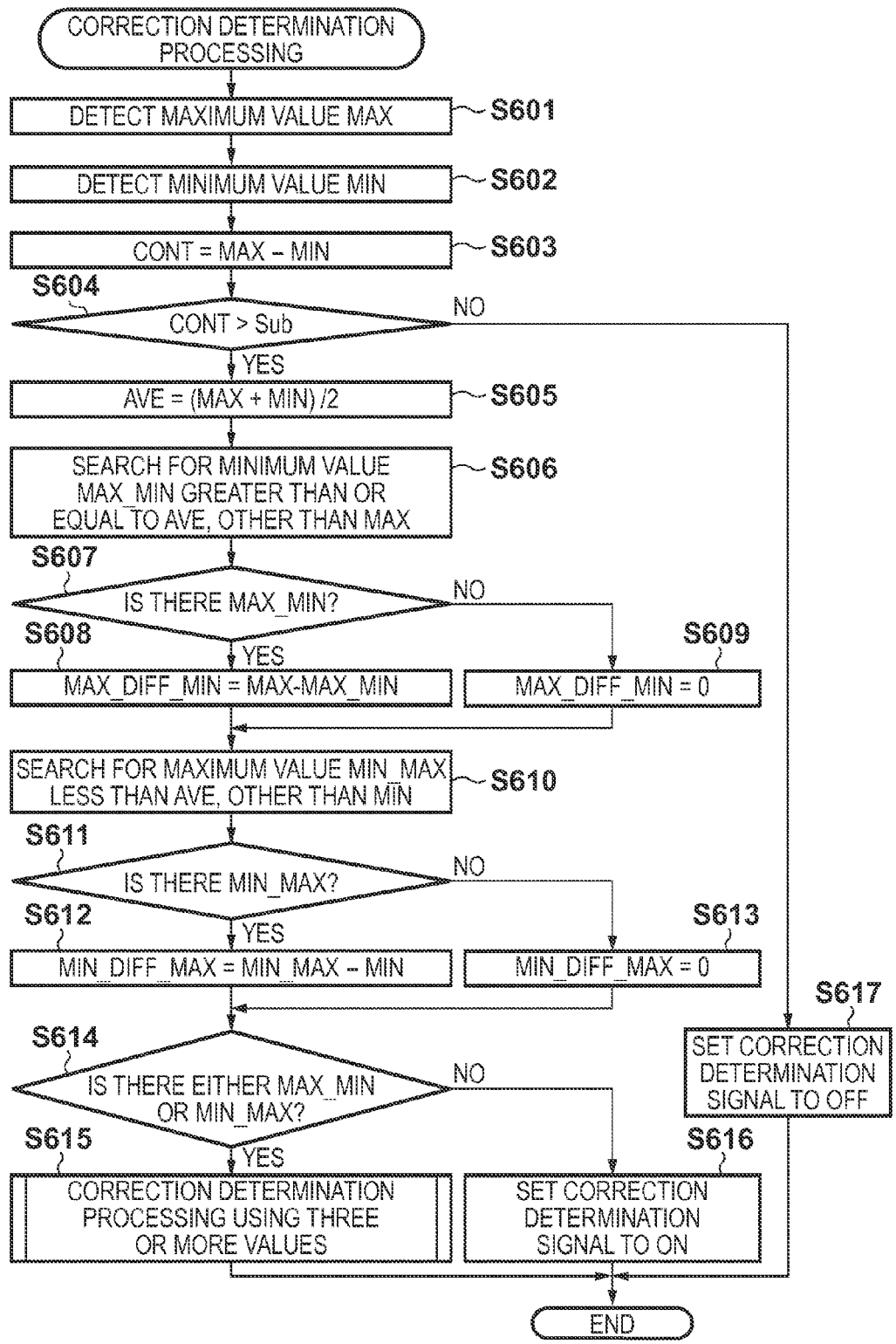
FIG. 6 is a flowchart showing correction determination processing.

Next is a detailed description of the correction determination processing performed by the correction determination unit 407 of the present embodiment, with reference to FIG. 6. The correction determination processing is processing for generating a correction determination signal by determining whether or not to perform smoothing processing, from the reference area.

First, in step S601, the correction determination unit 407 obtains a maximum pixel value MAX in the reference area composed of a total of nine pixels, specifically, three pixels in width by three pixels in height with the pixel of interest as the center. In step S602, the correction determination unit 407 obtains a minimum pixel value MIN in the reference area as in step S601.

Then, in step S603, the correction determination unit 407 obtains a contrast value CONT by subtracting the minimum value MIN from the maximum value MAX. Then, it is determined in step S604 whether or not the contrast value CONT is greater than a correction determination value Sub, and the procedure proceeds to step S605 if the contrast value CONT is greater, and otherwise to step S617. In step S605, the correction determination unit 407 obtains an average value AVE by adding the maximum value MAX and the minimum value MIN and dividing the result of the addition by two. In step S617, on the other hand, the correction determination unit 407 sets the correction determination signal to OFF and ends the correction determination processing.

Then, in step S606, the correction determination unit 407 searches for a pixel with a minimum pixel value MAX_MIN, out of pixels with pixel values greater than or equal to the average value AVE, other than the maximum value MAX, in the reference area.

Then, in step S607, the correction determination unit 407 determines the search result in step S606, and the procedure proceeds to step S608 if a pixel with the minimum pixel value MAX_MIN has been found, and otherwise to step S609. In step S608, the correction determination unit 407 obtains a difference value MAX_DIFF_MIN from the maximum value MAX by subtracting the minimum pixel value MAX_MIN from the maximum value MAX. In step S609, on the other hand, since a pixel with the minimum pixel value MAX_MIN has not been found, the correction determination unit 407 sets the difference value MAX_DIFF_MIN from the maximum value MAX to 0.

Then, in step S610, the correction determination unit 407 searches for a pixel with a maximum pixel value MIN_MAX, out of pixels with pixel values less than the average value AVE, other than the minimum value MIN, in the reference area.

Then, in step S611, the correction determination unit 407 determines the search result in step S610, and the procedure proceeds to step S612 if a pixel with the maximum pixel value MIN_MAX has been found, and otherwise to step S613. In step S612, the correction determination unit 407 obtains a difference value MIN_DIFF_MAX from the minimum value MIN by subtracting the minimum value MIN from the maximum pixel value MIN_MAX. In step S613, on the other hand, since a pixel with the maximum pixel value MIN_MAX has not been found, the correction determination unit 407 sets the difference value MIN_DIFF_MAX from the minimum value MIN to 0.

Then, in step S614, the correction determination unit 407 determines whether or not either or both of the minimum pixel value MAX_MIN and the maximum pixel value MIN_MAX have been found, and the procedure proceeds to step S615 if either or both has been found, and to step S616 if none of them have been found. In step S615, the correction determination unit 407 performs correction determination processing using three or more values, the details of which will be described later, and ends the current correction determination processing. In step S616, on the other hand, since the contrast value CONT is great enough, the correction determination unit 407 sets the correction determination signal to ON and ends the correction determination processing.

As described above, in the correction determination processing, in the case where the reference area is a simple area including less than three values, the correction determination signal can be generated by using only the contrast value CONT in determining whether or not each pixel is an edge pixel.

Figure 7:
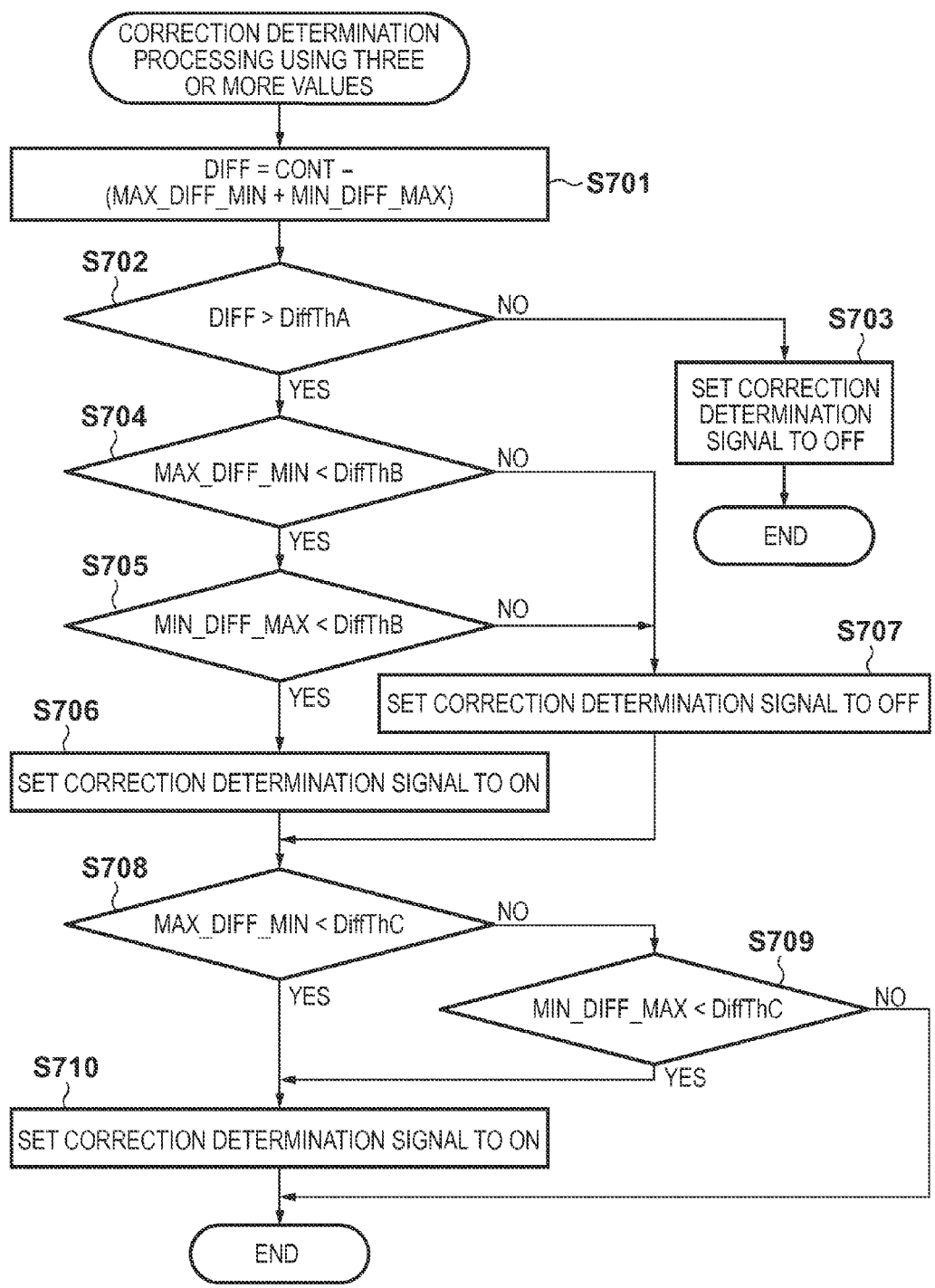
FIG. 7 is a flowchart showing correction determination processing using three or more values.

Next is a detailed description of the aforementioned correction determination processing using three or more values (step S615), with reference to FIG. 7. FIG. 7 is a flowchart showing the correction determination processing using three or more values according to the present embodiment. This correction determination processing is processing, performed in the case where there are three or more values in the reference area, for generating the correction determination signal by determining whether or not to perform smoothing processing.

First, in step S701, the correction determination unit 407 obtains a value DIFF indicating the distribution around the average value by subtracting, from the contrast value CONT, the difference value MAX_DIFF_MIN from the maximum value and the difference value MIN_DIFF_MAX from the minimum value.

Then, in step S702, the correction determination unit 407 determines whether or not the value DIFF is greater than a threshold value DiffThA. If the value DIFF is not greater than the threshold value, the procedure proceeds to step S703, in which the correction determination unit 407 sets the correction determination signal to OFF and ends the correction determination processing using three or more values by determining that there is no sharp change in pixel value in the reference area because the value DIFF is not great enough.

If the value DIFF is greater than the threshold value as a result of the determination, the procedure proceeds to step S704, in which the correction determination unit 407 determines whether or not the difference value MAX_DIFF_MIN from the maximum value is less than a threshold value DiffThB. If the difference value MAX_DIFF_MIN is less than the threshold value, the procedure proceeds to step S705, in which the correction determination unit 407 determines whether or not the difference value MIN_DIFF_MAX from the minimum value is less than the threshold value DiffThB. If the difference value MIN_DIFF_MAX is less than the threshold value, the procedure proceeds to step S706, in which the correction determination unit 407 sets the correction determination signal to ON by determining that there is a sharp change in pixel value in the reference area because both of the difference value MAX_DIFF_MIN from the maximum value and the difference value MIN_DIFF_MAX from the minimum value are small enough.

On the other hand, if the difference value from the maximum value is not less than the threshold value in step S704 or if the difference value from the minimum value is not less than the threshold value in step S705, the procedure proceeds to step S707, in which the correction determination unit 407 sets the correction determination signal to OFF by determining that there is no sharp change in pixel value in the reference area.

Then, in step S708, the correction determination unit 407 determines whether or not the difference value MAX_DIFF_MIN from the maximum value is less than a threshold value DiffThC, and the procedure proceeds to step S709 if the difference value MAX_DIFF_MIN is not less than the threshold value. In step S709, the correction determination unit 407 determines whether or not the difference value MIN_DIFF_MAX from the minimum value is less than the threshold value DiffThC, and ends the correction determination processing using three or more values if the difference value MIN_DIFF_MAX is not less than the threshold value.

On the other hand, if the difference value from the maximum value is less than the threshold value in step S708 or if the difference value from the minimum value is less than the threshold value in step S709, the procedure proceeds to step S710. In step S710, the correction determination unit 407 sets the correction determination signal to ON and ends the correction determination processing using three or more values by determining that there is a sharp change in pixel value in the reference area because either the difference value from the maximum value or the difference value from the minimum value is small enough.

Note that although each of the correction determination value Sub and the threshold values DiffThA to DiffThC is a single value in the above description of the correction determination processing and the correction determination processing using three or more values, needless to say multiple values may be used for the respective values. For example, a configuration is possible in which if the attribute of the pixel of interest, indicated by the attribute data input to the correction determination unit 407, is "image", the correction determination value Sub and the threshold value DiffThA are switched to greater values than those used for the other attributes, and the threshold values DiffThB and DiffThC to smaller values. A configuration is also possible in which if the attribute of the pixel of interest is "character" or "line", the correction determination value Sub and the threshold value DiffThA are switched to smaller values than those used for the other attributes, and the threshold values DiffThB and DiffThC to greater values. Such switching enables fine control, such as making images of complicated color or shape less likely to be corrected, or making characters or lines of uniform color or shape more likely to be corrected.

Although the case where the correction determination signal is generated through the correction determination processing and the correction determination processing using three or more values is taken as an example in the description of the present embodiment, the present invention is not limited thereto. Needless to say, for example, it is sufficient to, irrespective of the state of the reference area, determine whether or not to perform smoothing processing on edges, such as making a determination depending only on whether or not the contrast value in the reference area is great enough.

Figure 8:
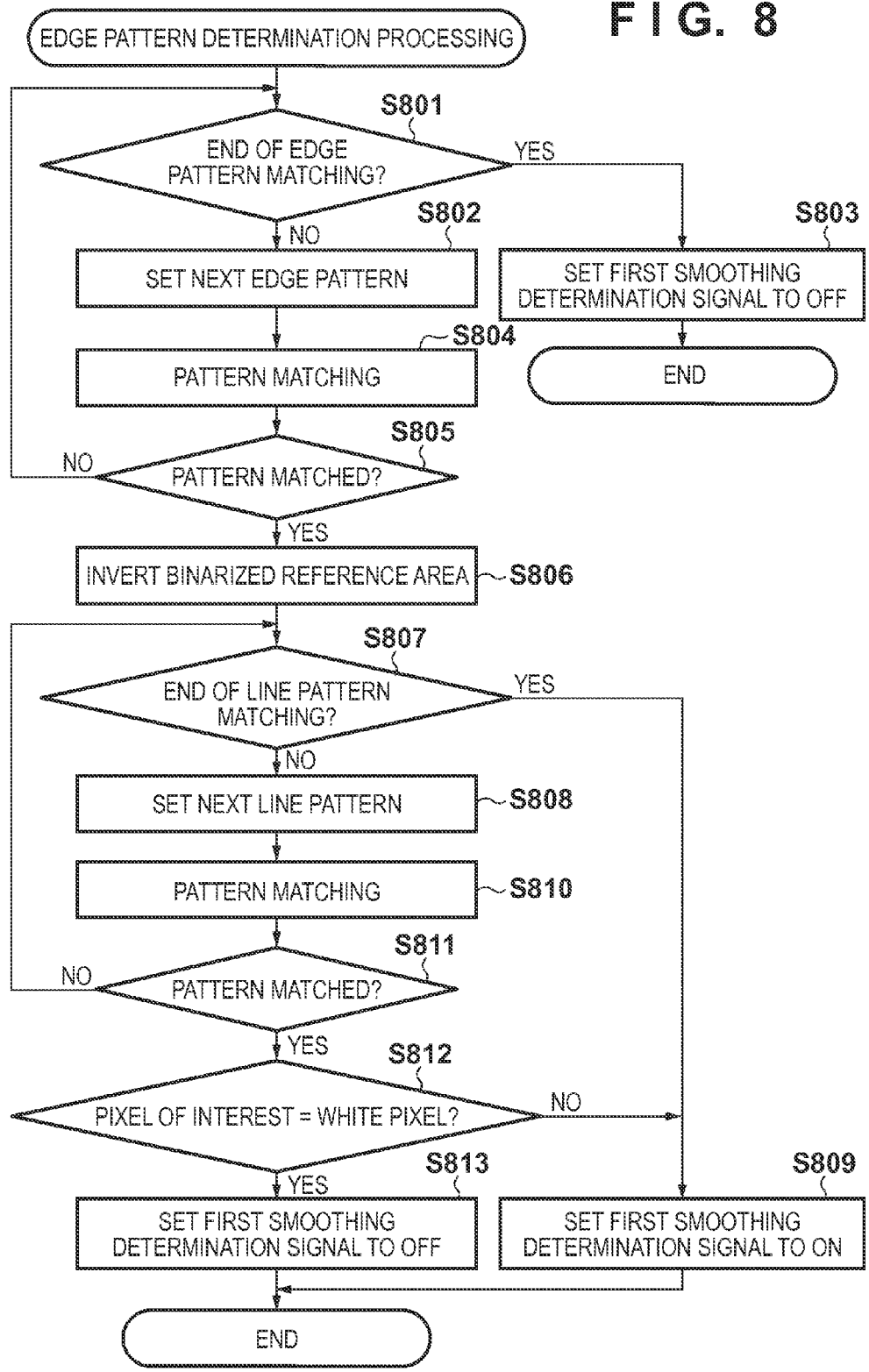
FIG. 8 is a flowchart showing processing for determining an edge pattern.
Figure 9:
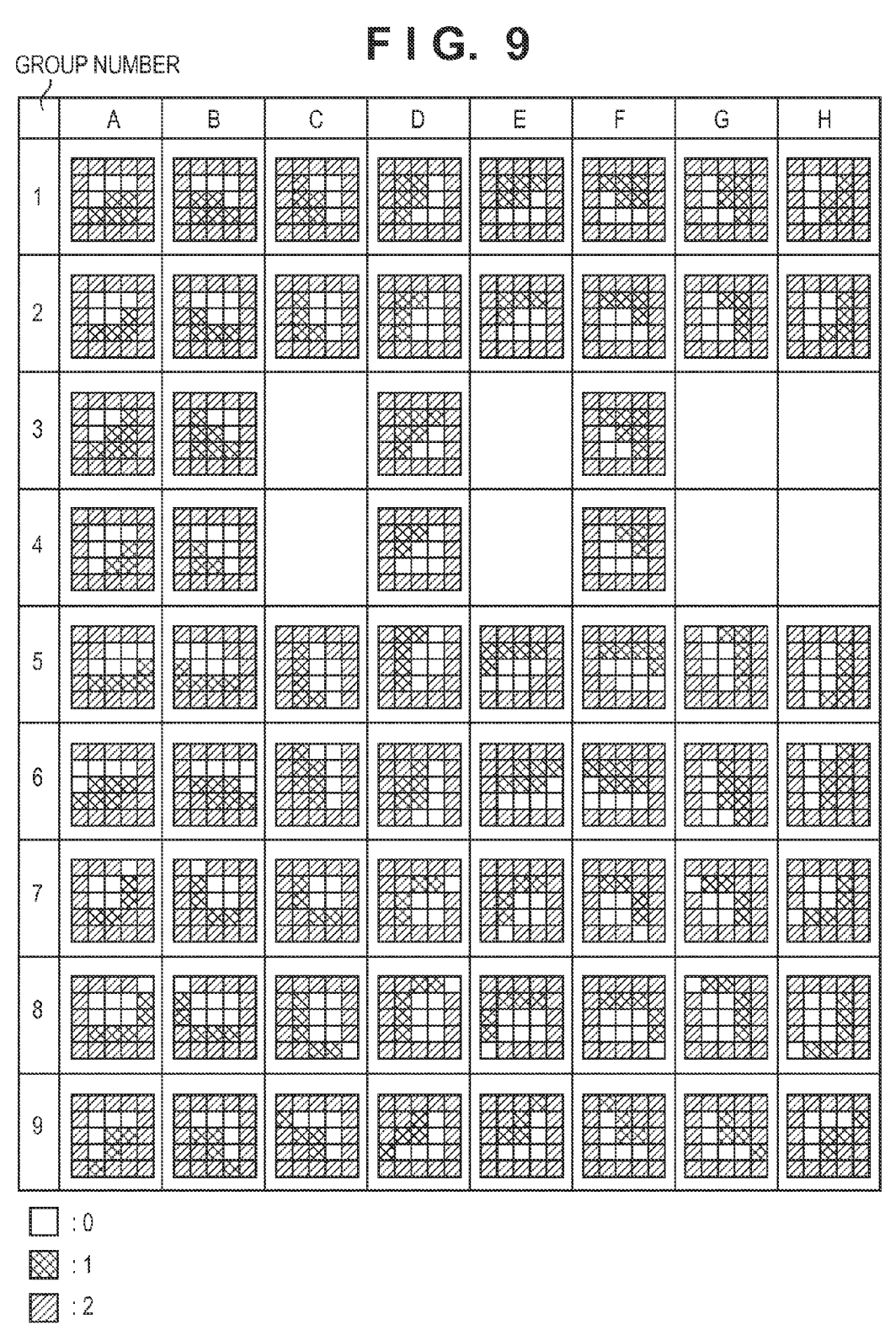
Figure 12:
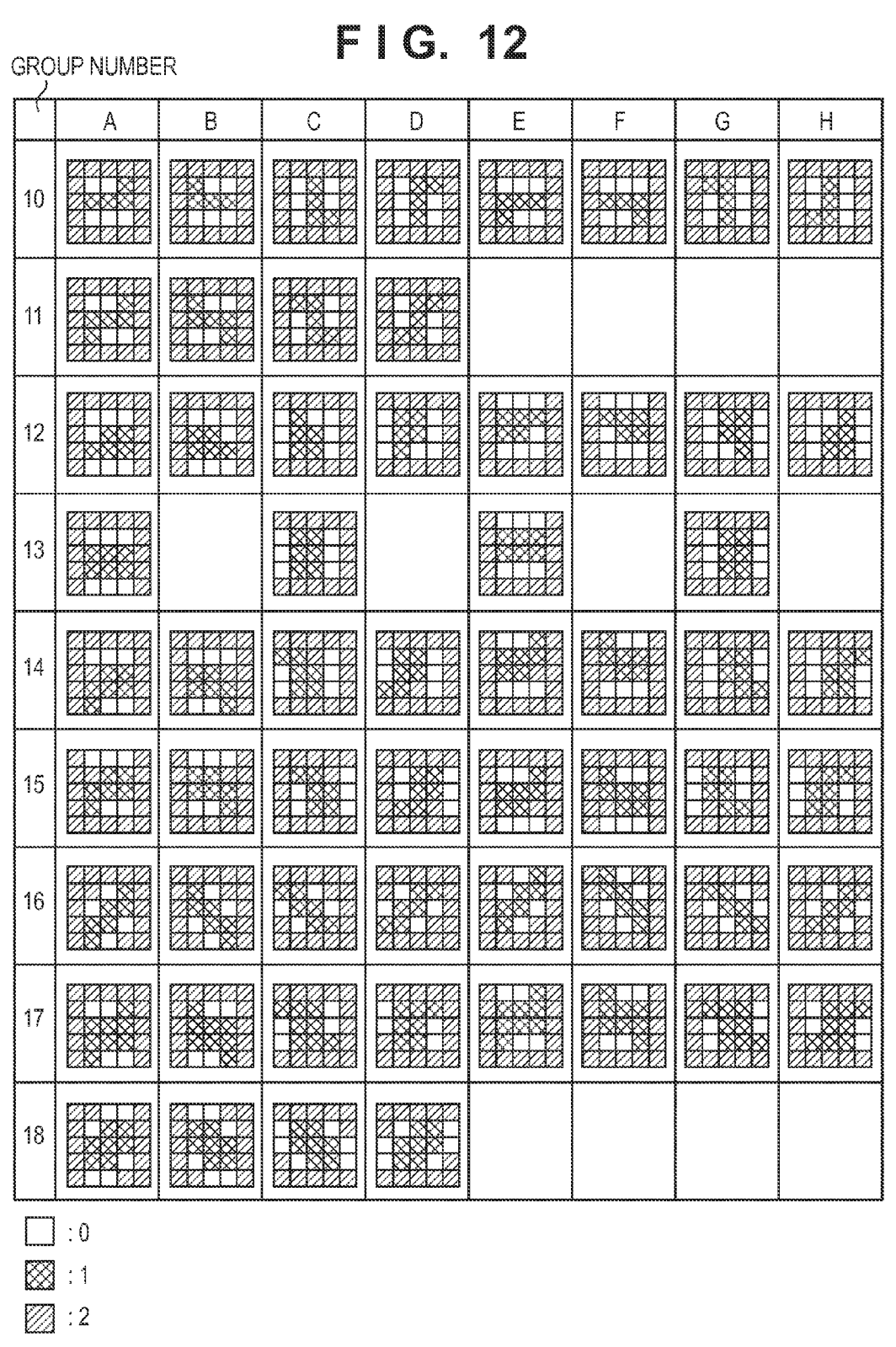

Next is a detailed description of the edge pattern determination processing performed by the edge pattern determination unit 409 of the present embodiment, with reference to FIGS. 8 to 12. FIG. 8 is a flowchart showing the edge pattern determination processing performed by the edge pattern determination unit 409. FIGS. 9 and 10 are diagrams showing examples of edge patterns according to the present embodiment, and FIGS. 11 and 12 are diagrams showing examples of line patterns according to the present embodiment. The edge pattern determination processing as referred to herein involves generating a first smoothing determination signal indicating whether or not to perform first smoothing processing.

First, in step S801, the edge pattern determination unit 409 determines whether or not comparison with all of the edge patterns has ended in pattern matching (step S804) described later, and the procedure proceeds to step S802 if the comparison has not ended, and to step S803 if the comparison has ended. The edge patterns are classified into 12 groups as shown in FIGS. 9 and 10, each group including eight types of edge patterns A to H. Each group consists of edge patterns of the same shape that are inverted or turned in different ways, and redundant edge patterns that are inverted or turned in the same way as any of the other edge patterns are excluded from each group. Each edge pattern has a dimension of five pixels in width and five pixels in height, each pixel having a value of 0, 1, or 2.

Then, in step S802, the edge pattern determination unit 409 sets the next edge pattern to be used in pattern matching, and thereafter the procedure proceeds to step S804. The edge patterns are set in ascending order from group 1 and in order from A to H within the same group. Note that not all of the edge patterns shown in FIGS. 9 and 10 need to be used, and whether or not to set an edge pattern may be determined arbitrarily for each edge pattern or each group. An edge pattern or group determined not to be set will not be set in step S802, and the next edge pattern or group is to be set.

Then, in step S804, the edge pattern determination unit 409 performs pattern matching between the reference area binarized by the edge binarization unit 408 and the set edge pattern. The pattern matching involves comparing the values of the pixels in the binarized reference area with the values of 25 pixels in the set edge pattern and determining whether or not all the pixels match, except those with a value of 2 in the edge pattern. It is assumed here that pixels with a value of 2 in the edge pattern are determined as "matched", irrespective of the values of the pixels at the corresponding positions in the binarized reference area.

Then, in step S805, the edge pattern determination unit 409 determines whether or not the binarized reference area and the set edge pattern has matched in the pattern matching in step S804, and the procedure proceeds to step S806 if they have matched, and otherwise returns to step S801.

In step S803, the edge pattern determination unit 409 sets the first smoothing determination signal to OFF and ends the edge pattern determination processing by determining that the 25 pixels in the binarized reference area do not match all of the edge patterns to be used.

Next, in step S806, the edge pattern determination unit 409 inverts all of the pixel values of the 25 pixels in the reference area binarized by the edge binarization unit 408. Specifically, a pixel value of 0 in the binarized reference area is inverted to 1, and a pixel value of 1 to 0.

Then, in step S807, the edge pattern determination unit 409 determines whether or not comparison with all of the line patterns has ended in pattern matching in step S810, which will be described later, and the procedure proceeds to step S808 if the comparison has not ended, and to step S809 if the comparison has ended. The line patterns are classified into 18 groups as shown in FIGS. 11 and 12, each group including eight types of line patterns A to H. Each group consists of line patterns of the same shape that are inverted or turned in different ways, and redundant line patterns that are inverted or turned in the same way as any of the other line patterns are excluded from each group. Each line pattern has a dimension of five pixels in width and five pixels in height, each pixel having a value of 0, 1, or 2.

Then, in step S808, the edge pattern determination unit 409 sets the next line pattern to be used in the pattern matching, and thereafter the procedure proceeds to step S810. The line patterns are set in ascending order from group 1 and in order from A to H within the same group. Note that not all of the line groups shown in FIGS. 11 and 12 need to be used, and whether or not to set a line pattern may be determined arbitrarily for each line pattern or each group. A line pattern or group determined not to be set will not be set in step S808, and the next line pattern or group is to be set.

Then, in step S810, the edge pattern determination unit 409 performs pattern matching between the reference area inverted in step S806 described above and the set line pattern. The pattern matching involves comparing the values of the 25 pixels in the inverted reference area with the values of 25 pixels in the set line pattern and determining whether or not all the pixels match, except those with a value of 2 in the line pattern. It is assumed here that pixels with a value of 2 in the line pattern are determined to be "matched", irrespective of the values of pixels at the corresponding positions in the binarized reference area.

Then, in step S811, the edge pattern determination unit 409 determines whether or not the inverted reference area and the set line pattern have matched in the pattern matching in step S810, and the procedure proceeds to step S812 if they have matched, and otherwise returns to step S807.

Then, in step S812, the edge pattern determination unit 409 determines whether or not the pixel of interest is a white pixel, from the combined data output from the combined data conversion unit 403, and the procedure proceeds to step S813 if the pixel of interest is a white pixel, and otherwise to step S809. Here, the determination of whether or not the pixel of interest is a white pixel is made depending on whether or not the value of the pixel of interest in the combined data is 0. The pixel of interest with a value of 0 is determined as a white pixel, and the pixel of interest with a value of 1 is determined as not a white pixel.

Note that the value of a white pixel does not necessarily have to be 0 in the determination of a white pixel in step S812. Needless to say, a configuration is possible in which, for example, a threshold value is set in advance and a pixel with a value less than or equal to that threshold value is determined as a white pixel.

In step S813, the edge pattern determination unit 409 sets the first smoothing determination signal to OFF and ends the edge pattern determination processing, since the 25 pixels in the inverted reference area have matched one of all of the line patterns to be used. In step S809, on the other hand, since the 25 pixels in the inverted reference area have not matched any of the line patterns to be used, the edge pattern determination unit 409 sets the first smoothing determination signal to ON and ends the edge pattern determination processing.

That is, whether or not to perform first smoothing processing is determined by the matching of the binarized reference area and any of the edge patterns, and whether or not to cancel the first smoothing processing is further determined by the matching of the inverted reference area and any of the line patterns. Through this determination, the first smoothing processing is performed on the edges detected from the image data. This prevents white thin lines or small characters on dark backgrounds from being blurred and thereby lowering reproducibility.

Note that the edge patterns and the line patterns used in the edge pattern determination processing are not limited to those shown in FIGS. 9 to 12, and needless to say other patterns may be used instead. It is also needless to say that other methods may be used to determine the patterns of edges and lines.

Next is a detailed description of the edge correction data generation processing performed by the edge-correction-data generation unit 404 of the present embodiment. The edge correction data generation processing is processing for generating edge correction data from the reference rectangle input from the 6-bit conversion unit 402.

First, the edge-correction-data generation unit 404 obtains a 4-bit average value AVE out of nine pixels in the input reference area, specifically, three pixels in width by three pixels in height with the pixel of interest as the center. It should be noted that in the present embodiment, the result of Equation (1) below is used as the average value in order to avoid a division.

if (SUM>480), SUM=480

$$AVE=(SUM>>5) \quad (1)$$

That is, the 4-bit average value AVE is obtained without a division by clipping a total SUM of the pixel values of the nine pixels to 480 and shifting the total SUM by five bits to the right (divided by 32). Needless to say, the average value may be obtained by, for example, dividing the total SUM of the pixel values of nine pixels by nine.

Lastly, the edge-correction-data generation unit 404 modulates the average value AVE using a one-dimensional look-up table and outputs the modulated value as the edge correction data. Here, the one-dimensional look-up table as used herein is a look-up table with 4-bit input and 4-bit output, and is basically set to have a linear characteristic in which the input value is output directly. It is, however, needless to say that other settings such as nonlinear output are also possible depending on the characteristics of a printer. It is also possible to hold and switch multiple one-dimensional look-up tables for use. In this case, these look-up tables may be held for the respective edge patterns or the respective groups of edge patterns to be used in the edge pattern determination processing, and may be switched according to the edge pattern matched in step S804 for use.

Figure 13:
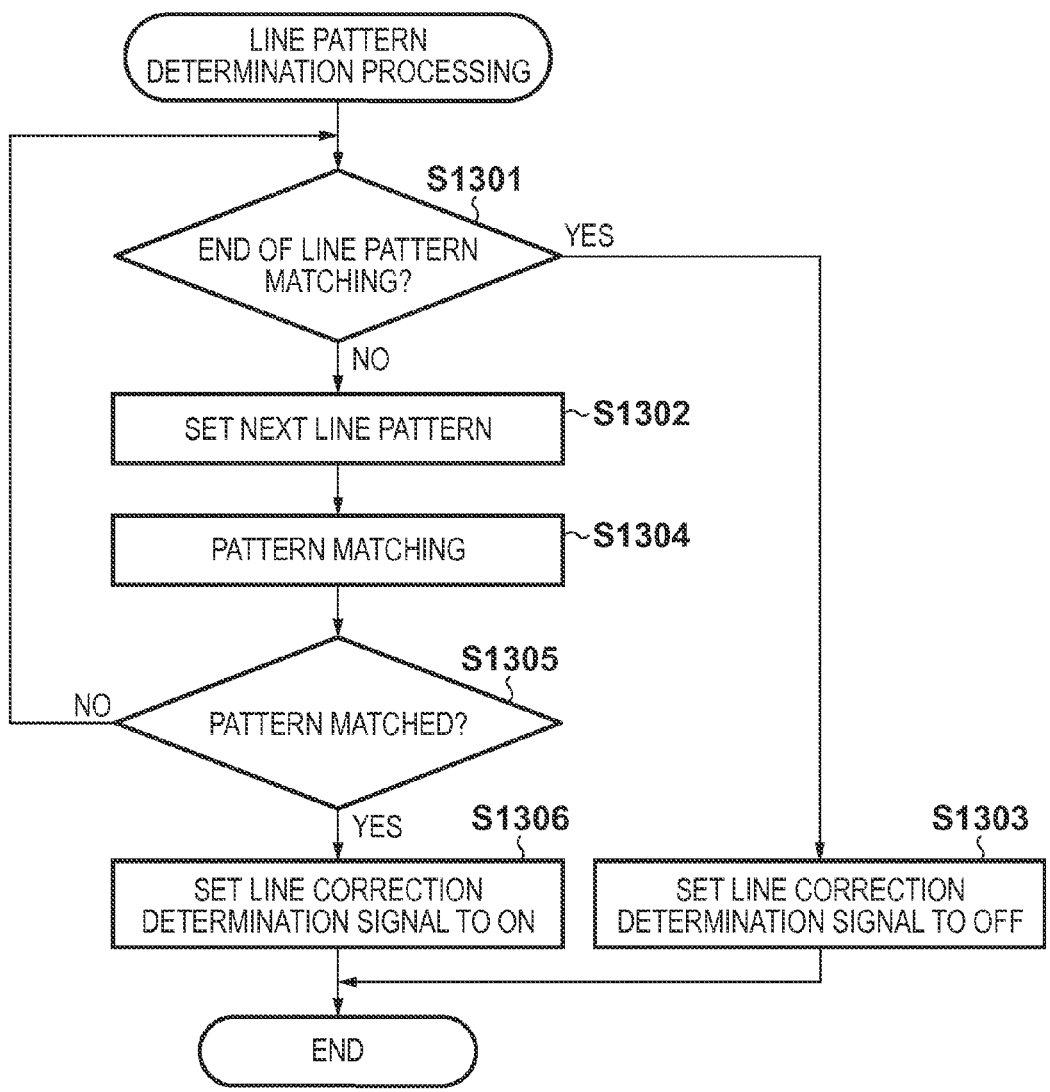
FIG. 13 is a flowchart showing processing for determining a line pattern.

Next is a detailed description of the line pattern determination processing performed by the line pattern determination unit 411 of the present embodiment, with reference to FIGS. 11 to 13. FIG. 13 is a flowchart of the line pattern determination processing performed by the line pattern determination unit 411. The line pattern determination processing is processing for generating a line correction determination signal indicating whether or not to perform line correction.

First, in step S1301, the line pattern determination unit 411 determines whether or not comparison with all of the line patterns has ended in pattern matching in step S1304, which will be described later, and the procedure proceeds to step S1302 if the comparison has not ended, and otherwise to step S1303. The line patterns to be used in the line pattern determination processing are the same as those used in the edge pattern determination processing and shown in FIGS. 11 and 12.

Then, in step S1302, the line pattern determination unit 411 sets the next line pattern to be used in the pattern matching, and the procedure proceeds to step S1304. The line patterns are set in ascending order from group 1 and in order from A to H within the same group. Note that not all of the lines patterns shown in FIGS. 11 and 12 need to be used, and whether or not to set a line pattern may be determined arbitrarily for each line pattern or each group. A line pattern or group determined not to be set will not be set in step S1302, and the next line pattern or group is to be set.

Then, in step S1304, the line pattern determination unit 411 performs pattern matching between the binarized reference area output from the pattern binarization unit 410 and the set line pattern. The pattern matching involves comparing the values of the 25 pixels in the binarized reference area with the values of 25 pixels in the set line pattern and determining whether or not all the pixels match, except those with a value of 2 in the line pattern. It is assumed here that pixels with a value of 2 in the line pattern are determined as "matched", irrespective of the values of pixels at the corresponding positions in the binarized reference area.

Then, in step S1305, the line pattern determination unit 411 determines whether or not the binarized reference area and the set line pattern have matched in the pattern patching in step S1304, and the procedure proceeds to step S1306 if they have matched, and otherwise returns to step S1301. In step S1306, since the binarized reference area matches one of all the line patterns to be used, the line pattern determination unit 411 sets the line correction determination signal to ON and ends the line pattern determination processing by determining that the location is where to perform line correction.

In step S1303, since the binarized reference area does not match any of the line patters to be used, the line pattern determination unit 411 sets the line correction determination signal to OFF and ends the line pattern determination processing.

Determining whether or not there is a line shape in the reference area in this way and performing line correction, which will be described later, prevents lines from being cut off or the like. Note that the line patterns used in the line pattern determination processing are not limited to those shown in FIGS. 11 and 12, and needless to say other patterns may be used instead. It is also needless to say that other methods may be used to determine the pattern of lines.

Next is a detailed description of the rendering pattern determination processing performed by the rendering pattern determination unit 412 of the present embodiment, with reference to FIGS. 14 to 17.

Figure 14:
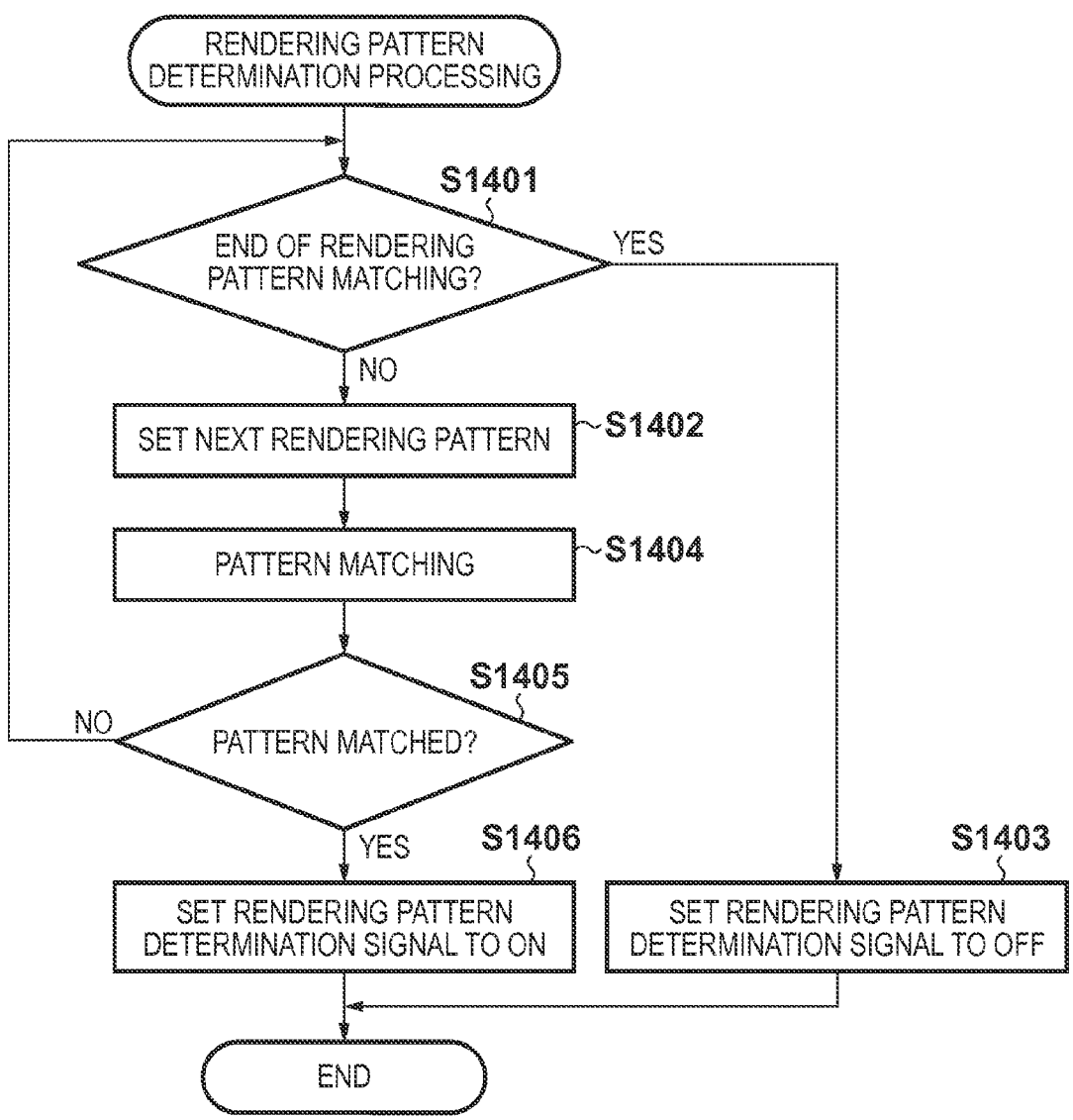
FIG. 14 is a flowchart showing processing for determining a rendering pattern.
Figure 15:
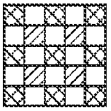
FIG. 15 is a diagram showing examples of rendering patterns.
Figure 16:
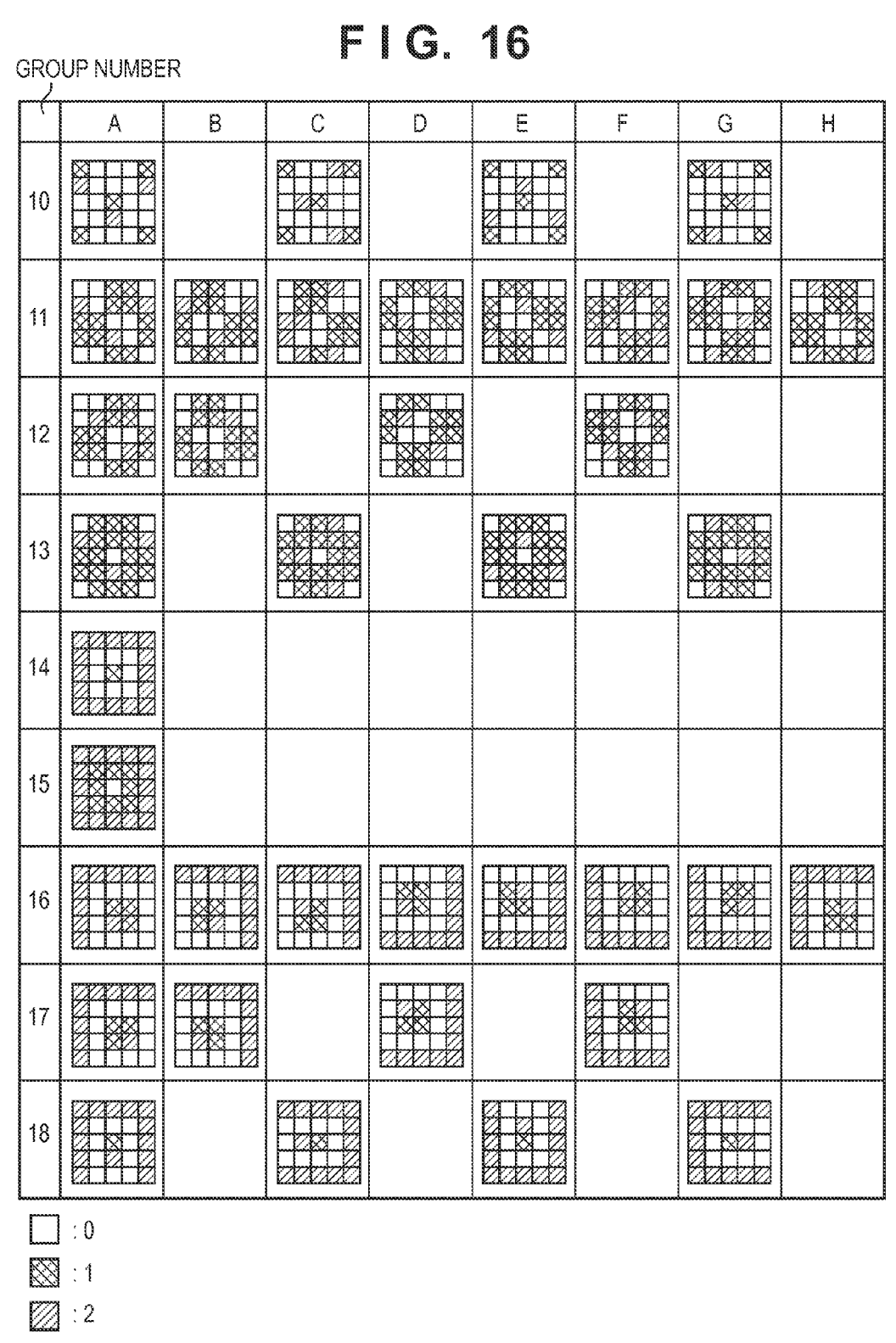
Figure 17:
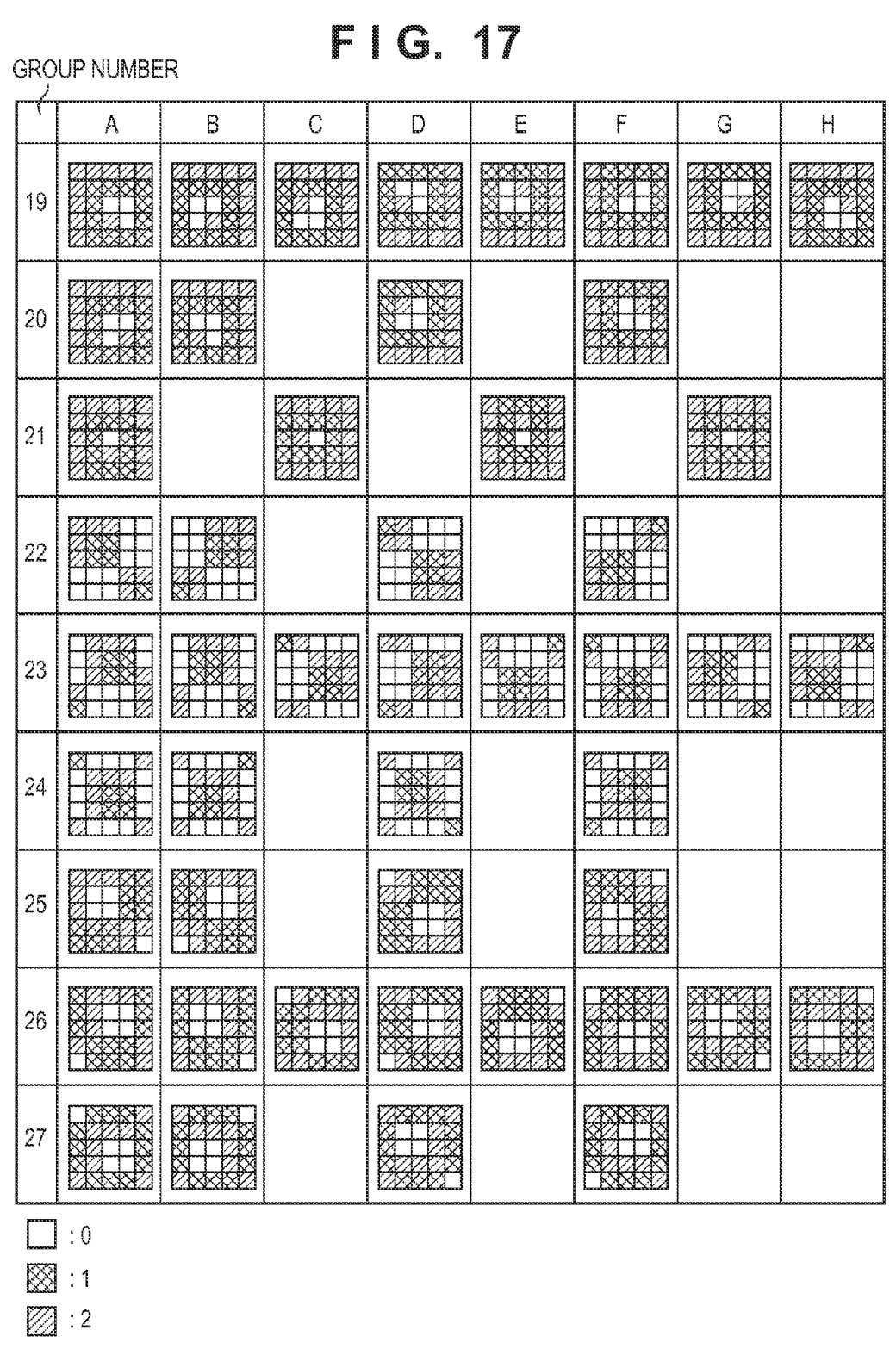

FIG. 14 is a flowchart showing the rendering pattern determination processing performed by the rendering pattern determination unit 412, and FIGS. 15, 16, and 17 are diagrams showing examples of rendering patterns according to the present embodiment. The rendering pattern determination processing is processing for generating a rendering pattern correction determination signal indicating whether or not to perform rendering pattern correction.

First, in step S1401, the rendering pattern determination unit 412 determines whether or not comparison with all of the rendering patterns has ended in pattern matching in step S1404, which will be described later, and the procedure proceeds to step S1402 if the comparison has not ended, and to step S1403 if the comparison has ended. The rendering patterns are classified into 27 groups as shown in FIGS. 15 to 17, each group including eight types of rendering patterns A to H. Each group consists of rendering patterns of the same shape that are inverted or turned in different ways, and redundant rendering patterns that are inverted or turned in the same way as any of the other rendering patterns are excluded from each group. Each rendering pattern has a dimension of five pixels in width and five pixels in height, each pixel having a value of 0, 1, or 2.

Then, in step S1402, the rendering pattern determination unit 412 sets the next rendering pattern to be used in the pattern matching, and thereafter the procedure proceeds to step S1404. The rendering patterns are set in ascending order from group 1 and in order from A to H within the same group. Note that not all of the rendering patterns shown in FIGS. 15 to 17 need to be used, and whether or not to set a rendering pattern may be determined arbitrarily for each rending pattern or each group. A rendering pattern or group determined not to be set will not be set in step S1402, and the next rendering pattern or group is to be set.

Then, in step S1404, the rendering pattern determination unit 412 performs pattern matching between the binarized reference area output from the pattern binarization unit 410 and the set rendering pattern. The pattern matching involves comparing the values of the 25 pixels in the binarized reference area with the values of 25 pixels in the set rendering pattern and determining whether or not all pixels match, except those with a value of 2 in the rendering pattern. It is assumed here that pixels with a value of 2 in the rendering pattern are determined as "matched", irrespective of the values of pixels at the corresponding positions in the binarized reference area.

Then, in step S1405, the rendering pattern determination unit 412 determines whether or not the binarized reference area and the set rendering pattern have matched in the pattern matching in step S1404, and the procedure proceeds to step S1406 if they have matched, and otherwise returns to step S1401. In step S1406, since the binarized reference area has matched one of all the rendering patterns to be used, the rendering pattern determination unit 412 sets the rendering pattern correction determination signal to ON and ends the rendering pattern determination processing by determining that the location is where to perform rendering pattern correction.

In step S1403, since the binarized reference area has not matched any of the rendering patterns to be used, the rendering pattern determination unit 412 sets the rendering pattern correction determination signal to OFF and ends the rendering pattern determination processing.

Determining whether or not there is a regular shape in the reference area in this way and performing the rendering pattern correction as described later prevents interference with regular shapes or the like. Note that the rendering patterns to be used in the rendering pattern determination processing are not limited to those shown in FIGS. 15 to 17, and needless to say other patterns may be used instead. It is also needless to say that other methods may be used to determine a rendering pattern including a regular shape.

Figure 18:
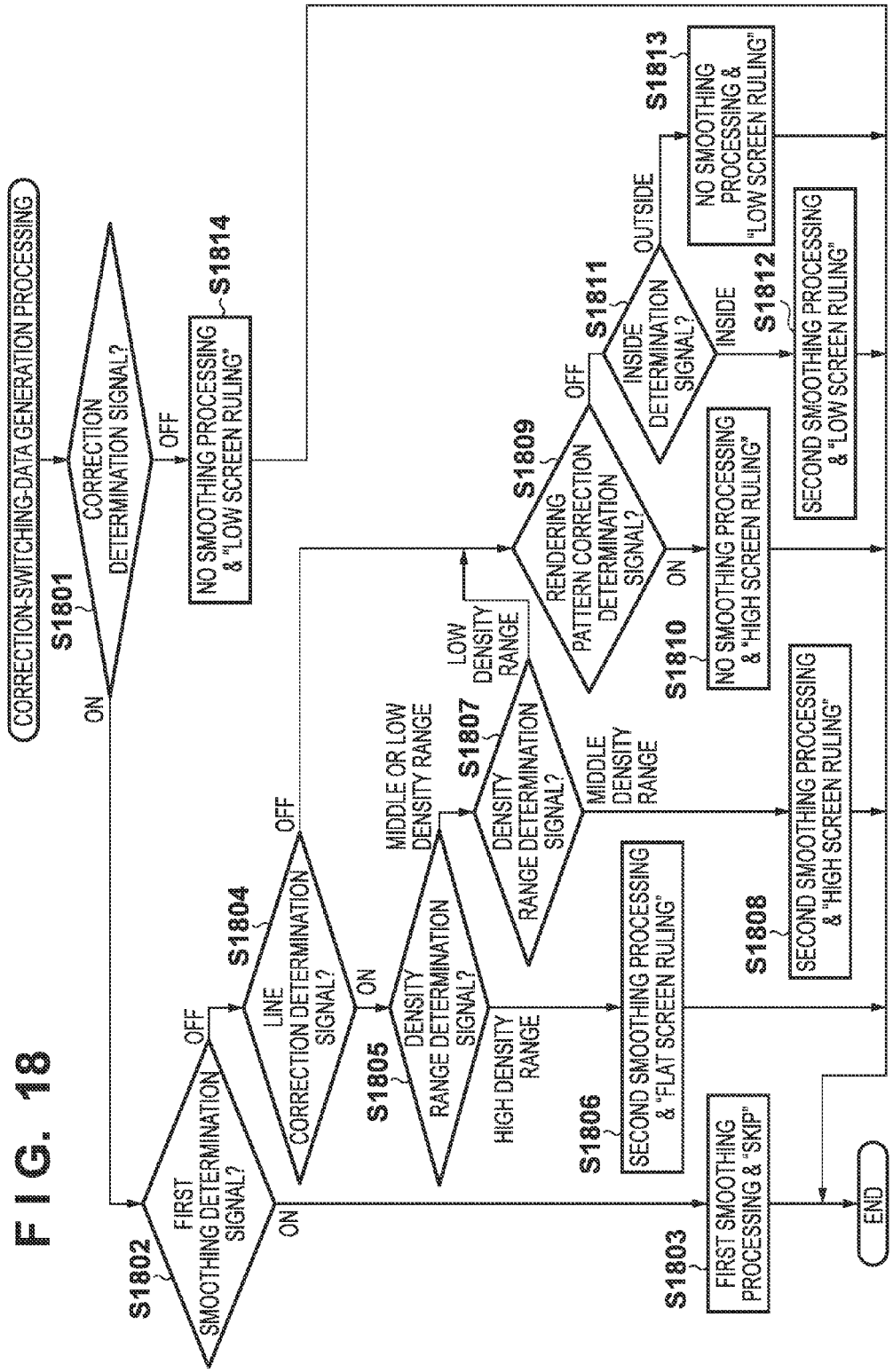
FIG. 18 is a flowchart showing processing for generating correction switching data.

Next is a detailed description of the correction-switching-data generation processing performed by the correction-switching-data generation unit 413 of the present embodiment, with reference to FIG. 18. FIG. 18 is a flowchart of the correction-switching-data generation processing performed by the correction-switching-data generation unit 413. The correction-switching-data generation processing is processing for generating correction switching data to be used to switch the processing performed by the edge correction unit 417, the gamma correction unit 304, and the halftone processing unit 305.

First, in step S1801, the correction-switching-data generation unit 413 determines whether or not the input correction determination signal is ON, and the procedure proceeds to step S1802 if the signal is ON (in the case of an edge), and to step S1814 if the signal is OFF (in the case of no edges). In step S1802, the correction-switching-data generation unit 413 determines whether or not the input first smoothing determination signal is ON, and the procedure proceeds to step S1803 if the signal is ON, and to step S1804 if the signal is OFF.

In step S1803, the correction-switching-data generation unit 413 generates correction switching data that includes the smoothing type of "first smoothing processing" and the screen type of "skip", and ends the correction-switching-data generation processing.

Note that if "first smoothing processing" is selected as the smoothing type, the screen type to be selected must be "skip". Also note that "skip" is not selected as the screen type in cases other than those where "first smoothing processing" is selected as the smoothing type.

In step S1804, the correction-switching-data generation unit 413 determines whether or not the input line correction determination signal is ON, and the procedure proceeds to step S1805 if the signal is ON, and to step S1809 if the signal is OFF. In step S1805, the correction-switching-data generation unit 413 determines whether or not the input density range determination signal indicates "high density range", and the procedure proceeds to step S1806 if the signal indicates "high density range", and otherwise to step S1807.

In step S1806, the correction-switching-data generation unit 413 generates correction switching data that indicates the smoothing type of "second smoothing processing" and the screen type of "flat screen ruling", and ends the correction-switching-data generation processing.

In step S1807, the correction-switching-data generation unit 413 determines whether or not the input density range determination signal indicates "middle density range", and the procedure proceeds to step S1808 if the signal indicates "middle density range", and to step S1809 if the signal indicates "low density range".

In step S1808, the correction-switching-data generation unit 413 generates correction switching data that indicates the smoothing type of "second smoothing processing" and the screen type of "high screen ruling", and ends the correction-switching-data generation processing.

In step S1809, the correction-switching-data generation unit 413 determines whether or not the rendering pattern correction determination signal is ON, and the procedure proceeds to step S1810 if the signal is ON, and to step S1811 if the signal is OFF.

In step S1810, the correction-switching-data generation unit 413 generates correction switching data that indicates the smoothing type of "no smoothing processing" and the screen type of "high screen ruling", and ends the correction-switching-data generation processing.

In step S1811, the correction-switching-data generation unit 413 determines whether or not the inside determination signal indicates "inside", and the procedure proceeds to step S1812 if the signal indicates "inside", and to step S1813 if the signal indicates "outside". In step S1812, the correction-switching-data generation unit 413 generates correction switching data that indicates the smoothing type of "second smoothing processing" and the screen type of "low screen ruling", and ends the correction-switching-data generation processing.

In steps S1813 and S1814, the correction-switching-data generation unit 413 generates correction switching data that indicates the smoothing type of "no smoothing processing" and the screen type of "low screen ruling", and ends the correction-switching-data generation processing.

In this way, the correction-switching-data generation processing enables processing to be switched adaptively according to the state of the reference area by switching the smoothing type and the screen type using the determination signals generated through the various types of determination processing described above.

Note that although the three screen types, namely, "flat screen ruling", "high screen ruling", and "low screen ruling", are used in the present embodiment, the present invention is not limited thereto. For example, a halftone processing method that does not use dither matrices, such as an error diffusion method, may be used instead.

Furthermore, the smoothing type and the screen type to be set according to the respective determination signals are not limited to those described above, and needless to say arbitrary smoothing types and screen types may be set.

Figure 19:
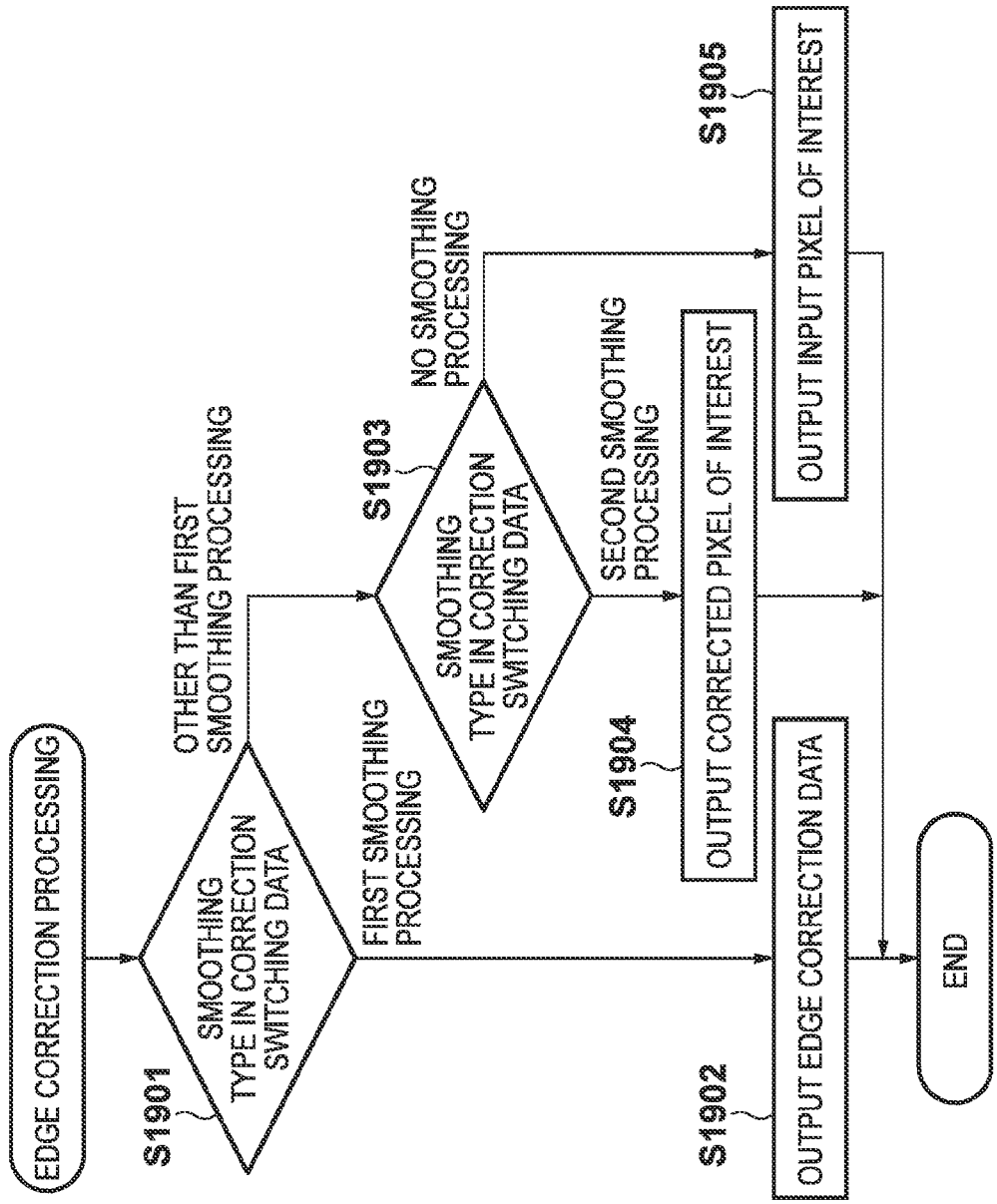
FIG. 19 is a flowchart showing edge correction processing.

Next is a detailed description of the edge correction processing performed by the edge correction unit 417 of the present embodiment, with reference to FIG. 19. FIG. 19 is a flowchart showing the edge correction processing performed by the edge correction unit 417. The edge correction processing is processing for selecting one of the input pixel of interest, the corrected pixel of interest, and the edge correction data based on the correction switching data and performing first smoothing processing, as well as for performing density correction for second smoothing processing.

First, in step S1901, the edge correction unit 417 determines the smoothing type in the correction switching data, and the procedure proceeds to step S1902 if the smoothing type is "first smoothing processing", and otherwise to step S1903. In step S1902, the edge correction unit 417 performs first smoothing processing by outputting the edge correction data, and ends the edge correction processing.

In step S1903, the edge correction unit 417 determines the smoothing type in the correction switching data, and the procedure proceeds to step S1904 if the smoothing type is "second smoothing processing", and to step S1905 if the smoothing type is "no smoothing processing". In step S1904, the edge correction unit 417 performs correction, by outputting the pixel of interest corrected by the density correction unit 416, so as to reduce the density of the edge (pixel value) that will change due to the second smoothing processing described later, and ends the edge correction processing.

In step S1905, since the location is where smoothing processing is not to be performed, the edge correction unit 417 outputs the input pixel of interest and ends the edge correction processing.

In this way, the edge correction processing enables both the first smoothing processing and the density correction for second smoothing processing to be performed by selectively switching image data to be output, in accordance with the correction switching data.

Figure 20:
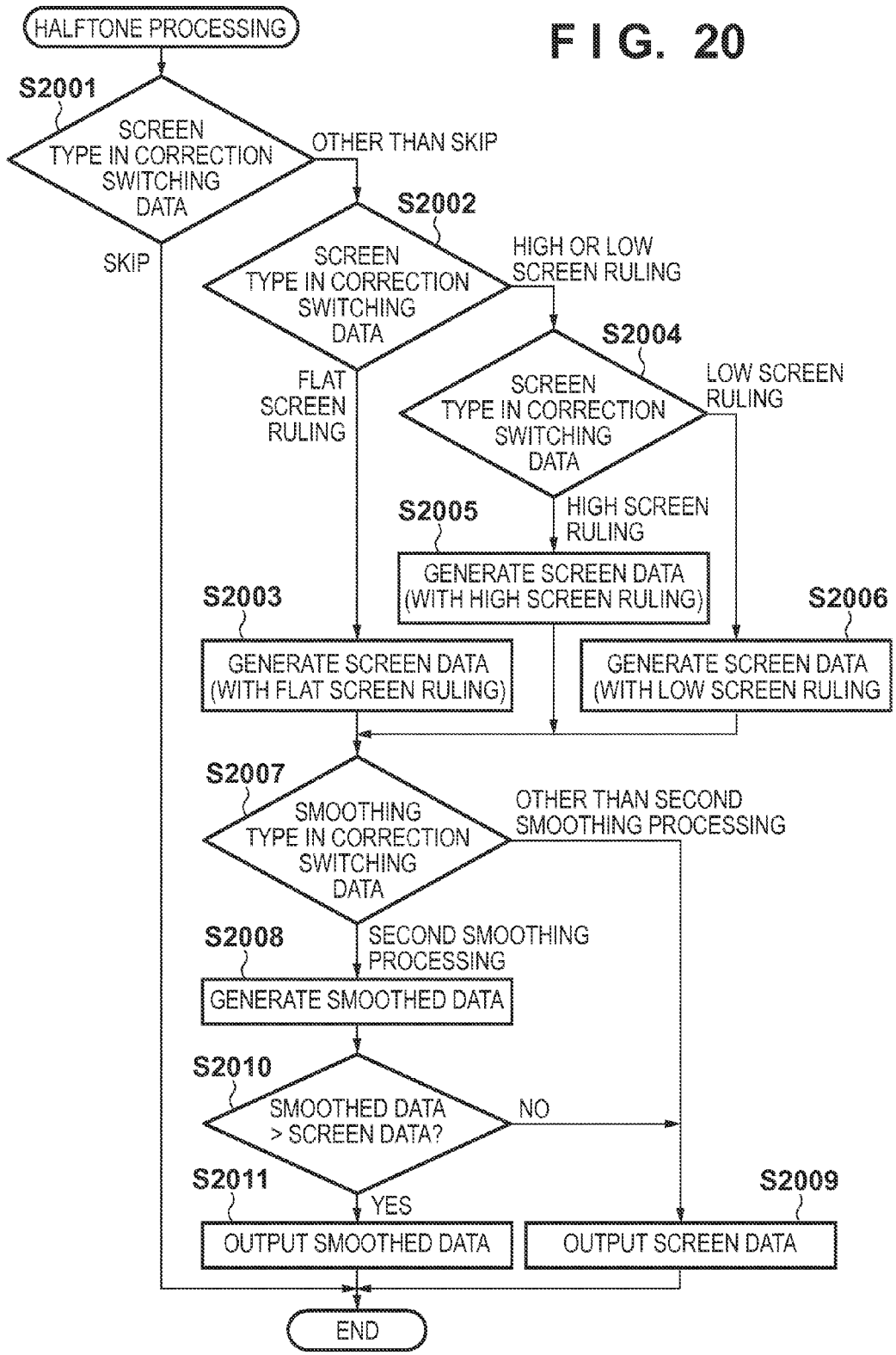
FIG. 20 is a flowchart showing halftone processing.
Figure 21:
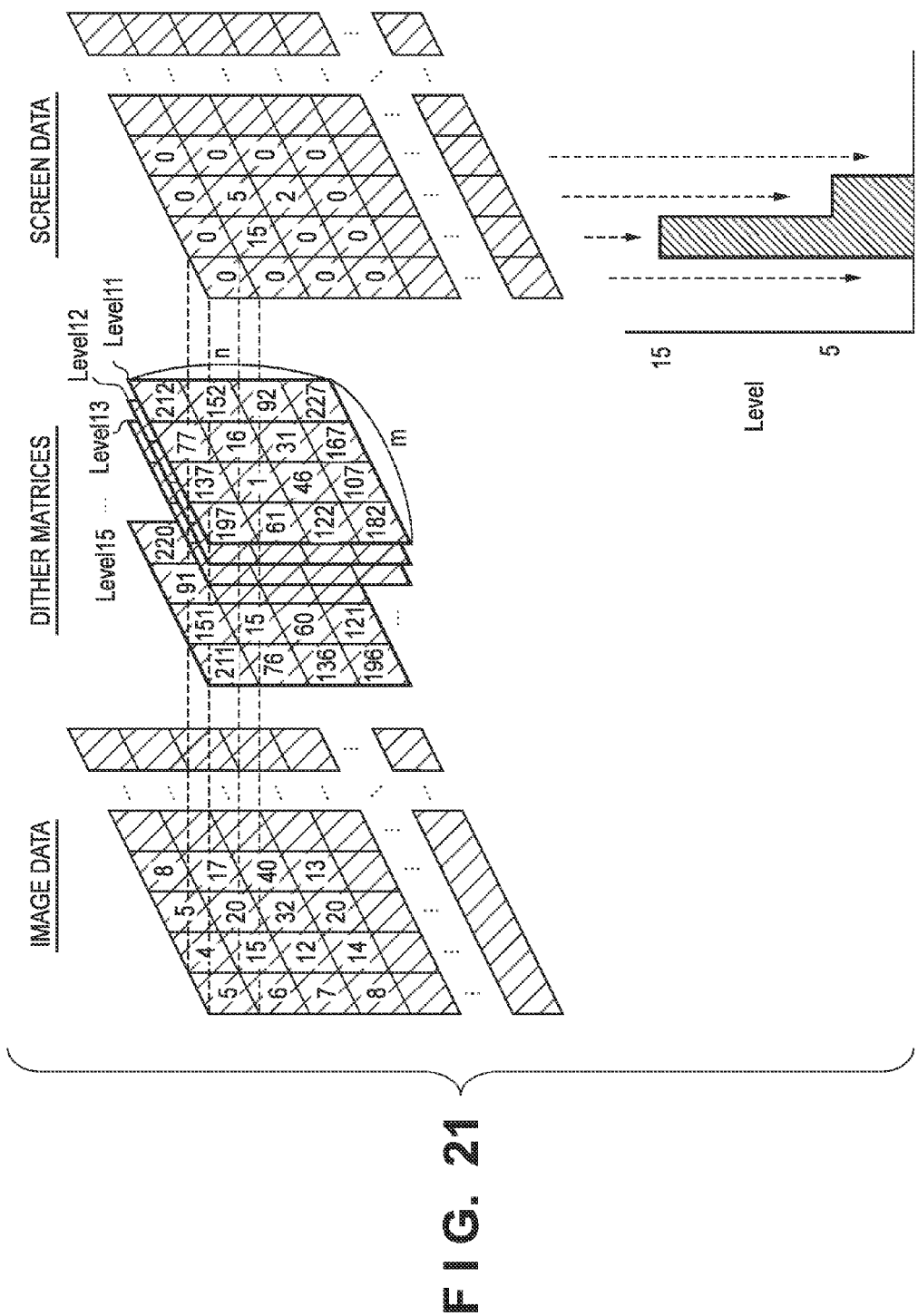
FIG. 21 is a diagram showing dither matrices that grow with a growth method using a high screen ruling or a low screen ruling.
Figure 22:
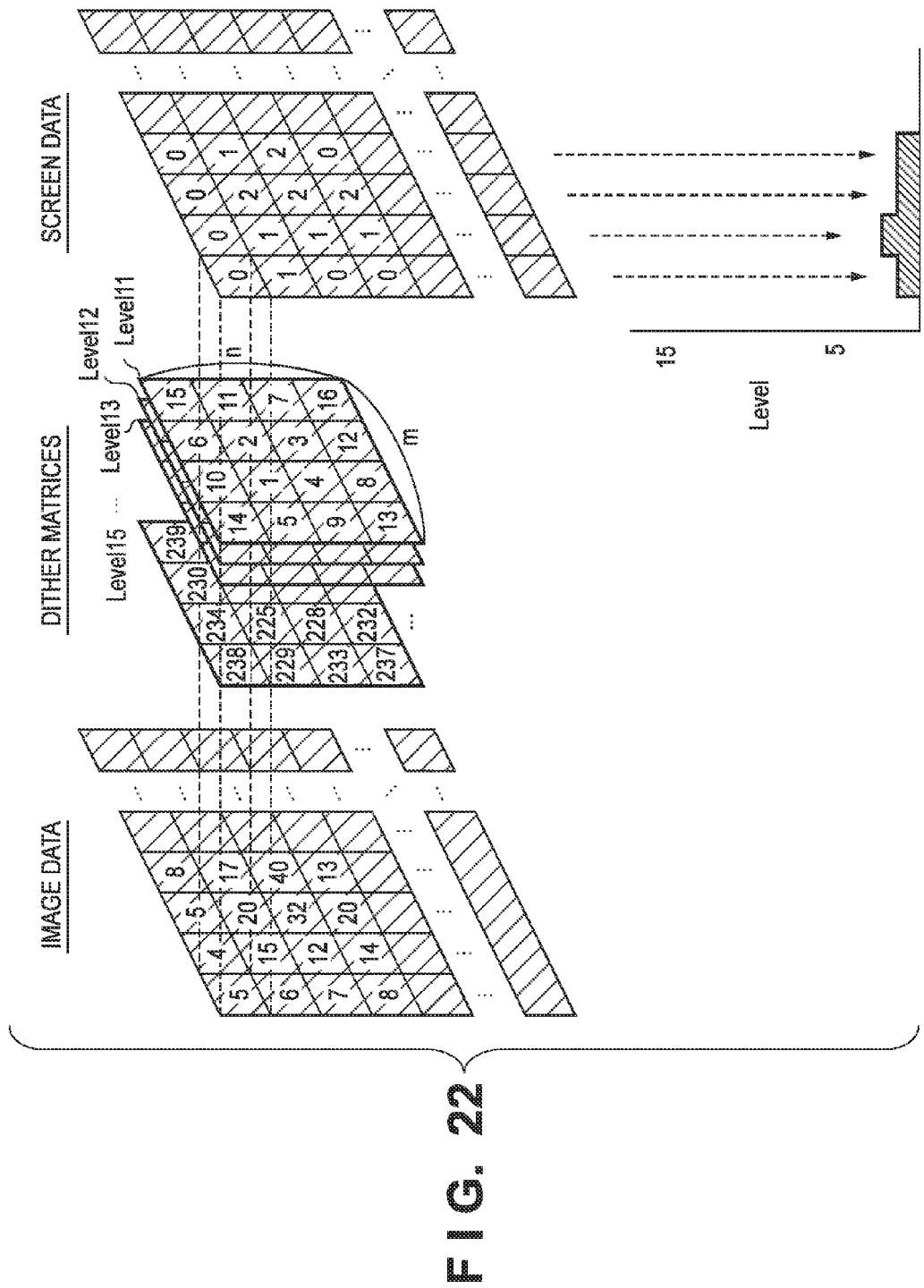
FIG. 22 is a diagram showing dither matrices that grow with a growth method using a flat screen ruling.

Next is a detailed description of the halftone processing performed by the halftone processing unit 305 of the present embodiment, with reference to FIGS. 20 to 22. FIG. 20 is a flowchart showing the halftone processing performed by the halftone processing unit 305. The halftone processing is processing for converting the input image data into 4-bit image data printable by the printer unit 103, through screen processing using the correction switching data, as well as for performing the second smoothing processing in order to reduce jaggies.

First, in step S2001, the halftone processing unit 305 determines the screen type in the correction switching data, and if the screen type is "skip", outputs the input image data directly and ends the halftone processing. That is, for pixels whose screen type in the correction switching data is "skip", the 4-bit edge correction data is to be output because these pixels have undergone the first smoothing processing performed by the smoothing determination unit 303. If the screen type in the correction switching data is other than "skip" in step S2001, the procedure proceeds to step S2002.

Then, in step S2002, the halftone processing unit 305 determines the screen type in the correction switching data, and the procedure proceeds to step S2003 if the screen type is "flat screen ruling", and otherwise to step S2004. In step S2004, the halftone processing unit 305 determines the screen type in the correction switching data, and the procedure proceeds to step S2005 if the screen type is "high screen ruling", and to step S2006 if the screen type is "low screen ruling".

Then, in steps S2003, S2005, and S2006, the halftone processing unit 305 converts the image data into 4-bit screen data by a multi-value dithering method using dither matrices that correspond to the screen type in the correction switching data. Here, the flat screen ruling to be employed in step S2003 refers to a ruling that uses dither matrices with which a regular cycle of halftone dots is less likely to appear.

Unlike the flat screen ruling, the high screen ruling to be employed in step S2005 and the low screen ruling to be employed in step S2006 refer to rulings that use dither matrices with which a halftone dot cycle appears quite noticeably. FIG. 21 is a diagram showing dither matrices that grow by a growth method using a high screen ruling or a low screen ruling. FIG. 22 is a diagram showing dither matrices that grow by a growth method using a flat screen ruling with the same screen angle and the same number of lines on the screen as those in FIG. 21. The same image data is input in both cases.

In FIG. 21, threshold values are defined to increase in the direction of levels, that is, to increase tone, among squares with the same coordinates of different levels of dither matrices. It can be seen that, after a single square with one coordinates has grown to a maximum level, adjacent coordinate squares grow similarly in the direction of levels such that halftone dots are to be concentrated.

As a result, the screen data to be output will grow as well in the direction of levels, so the pattern of halftone dots appears quite noticeably with high screen rulings or low screen rulings. As compared with high screen rulings or low screen rulings, flat screen rulings are less likely to have such cyclicity and thus enables more accurate reproduction of object shapes, but are not suitable for reproduction of rich colors because their tone characteristics are unstable.

With high screen rulings, halftone dots are formed in shorter cycles (higher frequency) than with low screen rulings, and fine objects can be expressed with high resolutions, but tone characteristics are relatively unstable. In contrast, low screen rulings are unsuitable for reproduction of fine objects because of their low resolutions, but are suitable for reproduction of rich colors because of their stable tone characteristics. That is, in the present embodiment, flat screen rulings are applied to thin lines in the high density range, for which higher priority is given to shape reproduction than to color reproduction. Also, high screen rulings are applied to thin lines in the middle density range and rendering patterns, for which both color reproduction and shape reproduction are required to be achieved, and low screen rulings are applied to other objects for which higher priority is given to color reproduction.

Then, in step S2007, the halftone processing unit 305 determines the smoothing type in the correction switching data, and the procedure proceeds to step S2008 if the smoothing type is "second smoothing processing", and otherwise to step S2009. In step S2008, the halftone processing unit 305 generates smoothed data. The smoothed data is generated by modulating the four most significant bits of the image data that has undergone the density correction performed by the density correction unit 416, using a one-dimensional look-up table. The look-up table as used herein refers to a look-up table with 4-bit input and 4-bit output, and is basically set to have a linear characteristic in which the input value is output directly. It is, however, needless to say that settings such as nonlinear output are also possible depending on the characteristics of a printer.

Then, in step S2010, the halftone processing unit 305 compares, for each pixel, the value in the screen data and the value in the smoothed data. The procedure proceeds to step S2011 if the value in the smoothed data is greater than that in the screen data, and otherwise to step S2009. In step S2011, the halftone processing unit 305 outputs the smoothed data to the printer unit 103 and ends the halftone processing. In step S2009, the halftone processing unit 305 outputs the screen data to the printer unit 103 and ends the halftone processing.

In this way, the halftone processing enables the screen type to be switched adaptively according to the correction switching data, as well as the second smoothing processing to be performed on the image data whose density has been corrected through the density correction processing.

Figure 23A:
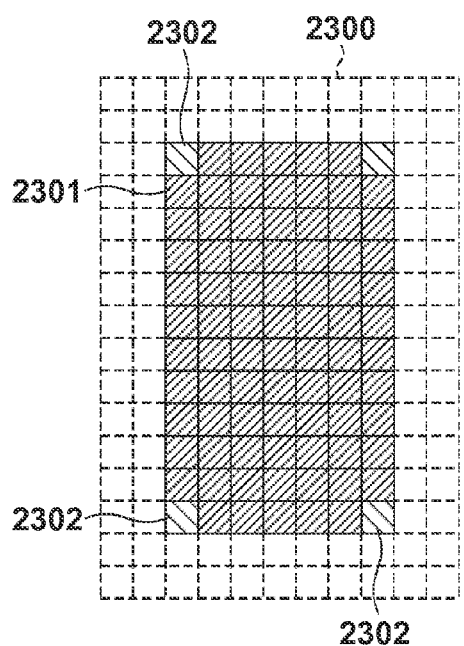
FIGS. 23A to 23D are diagrams showing an example of the result of processing performed by a halftone processing unit 305.

Next is a detailed description of processing examples and processing results according to the present embodiment, with reference to FIGS. 23A to 23D and FIGS. 25A to 25D. FIGS. 23A to 23D and FIGS. 25A to 25D are diagrams showing examples of the results of processing performed by the halftone processing unit 305 of the present embodiment. FIG. 24 is a diagram showing an example of the one-dimensional look-up table set in the density correction unit 416.

First, an example of the case where the density correction processing is not performed by the density correction unit 416 of the smoothing determination unit 303 according to the present embodiment will be described with reference to FIGS. 23A to 23D. FIG. 23A shows image data to be input to the halftone processing unit 305. In this case, a one-dimensional linear look-up table 2400 shown in FIG. 24 has been set in the density correction unit 416 of the smoothing determination unit 303. That is, a case is shown in which the density correction processing is not performed for the second smoothing processing. Reference numeral 2300 denotes a pixel serving as a white background, 2301 a rectangular object having a medium density color, and 2302 a pixel that has undergone the first smoothing processing performed by the smoothing determination unit 303.

Figure 23B:
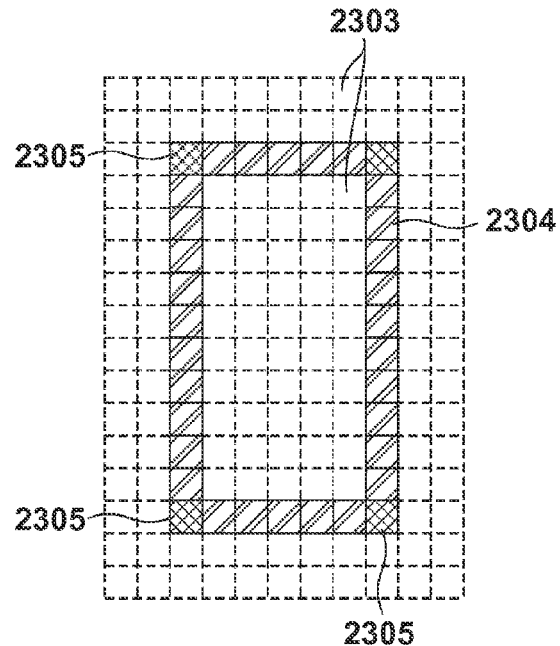
Figure 24:
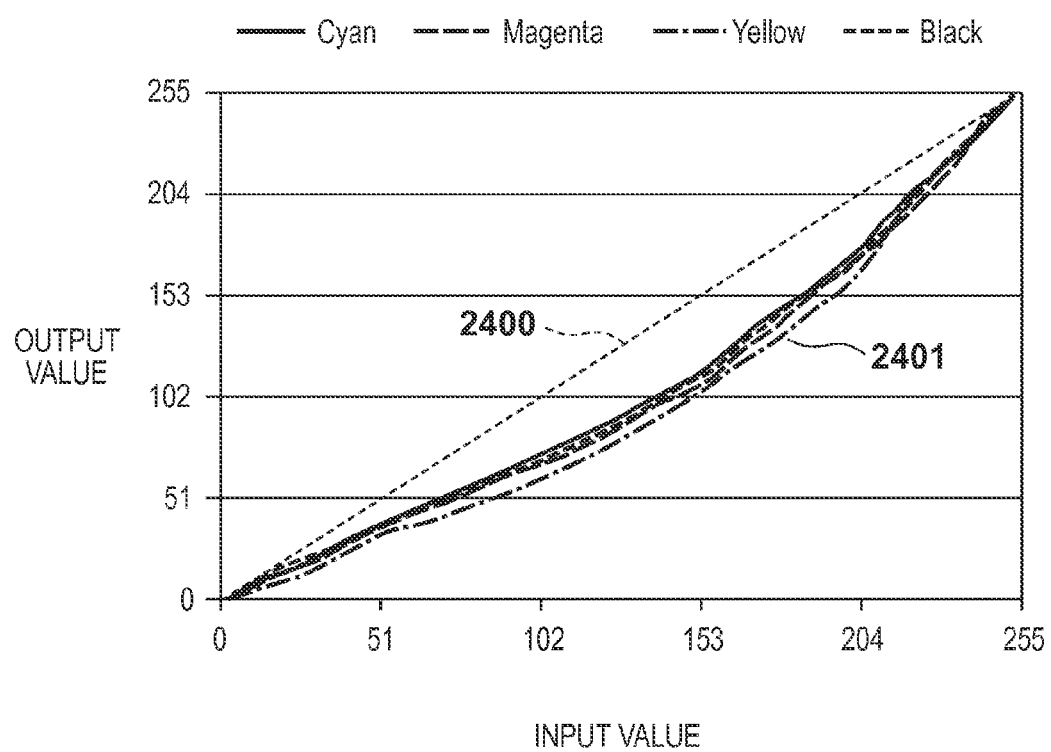
FIG. 24 is a diagram showing an example of a one-dimensional look-up table.

FIG. 23B shows correction switching data to be input to the halftone processing unit 305. Reference numeral 2303 denotes a pixel whose smoothing type in the correction switching data is "no smoothing processing", 2304 a pixel whose smoothing type is "second smoothing processing", and 2305 a pixel whose smoothing type is "first smoothing processing". Also, the screen type of the pixels 2303 and 2304 in the correction switching data is "low screen ruling", and the screen type of the pixel 2305 is "skip".

Figure 23C:
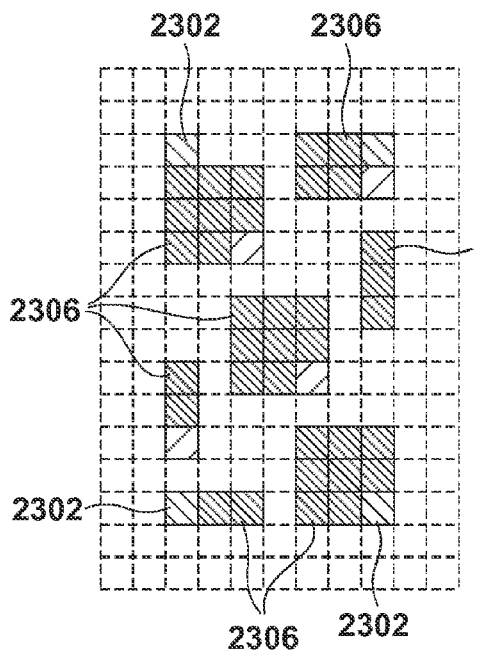

FIG. 23C shows screen data to be generated by the halftone processing unit 305 in step S2003, S2005, or S2006. Reference numeral 2306 denotes a pixel that has been converted into a halftone dot as a result of application of a low screen ruling. The pixels 2302 are directly output because their screen type in the correction switching data is "skip".

Figure 23D:
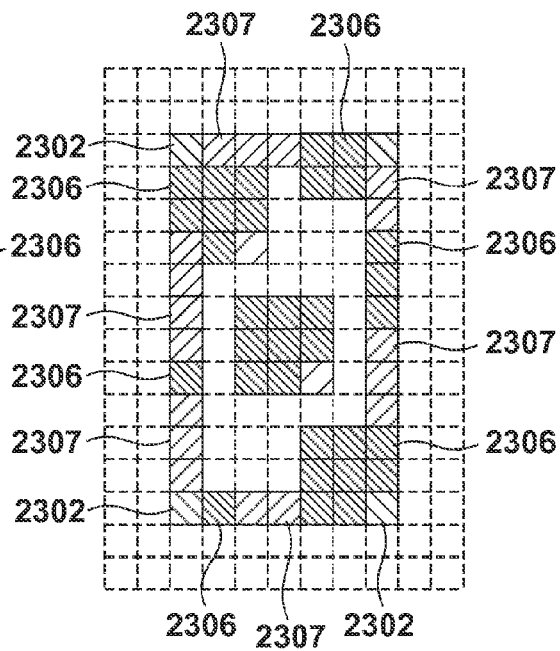

FIG. 23D shows image data to be output from the halftone processing unit 305. The image data is obtained by comparing, for each pixel whose smoothing type in the correction switching data is "second smoothing processing", the value in the smoothed data and the value in the screen data in FIG. 23C and outputting the greater value. Reference numeral 2307 denotes a pixel for which the smoothed data is output because the value in the smoothed data is greater than that in the screen data. As can be seen from a comparison between FIGS. 23C and 23D, the density of edges to which the second smoothing processing has been applied simply increases because of the addition of the smoothed data.

Figure 25A:
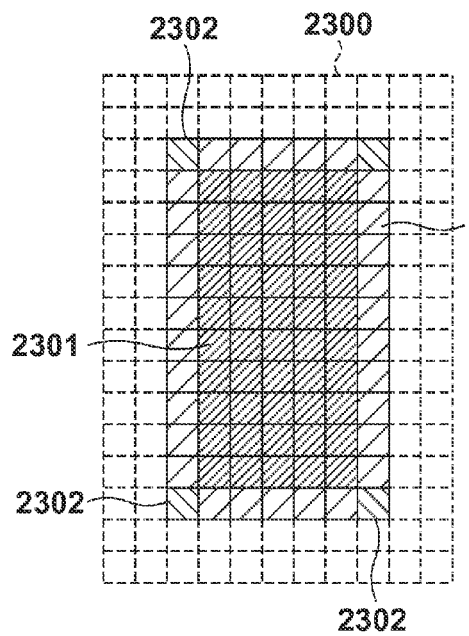
FIGS. 25A to 25D are diagrams showing an example of the result of processing performed by the halftone processing unit 305.

Next, an example of the case where the density correction processing is performed by the density correction unit 416 of the smoothing determination unit 303 according to the present embodiment will be described with reference to FIGS. 25A to 25D. FIG. 25A shows image data to be input to the halftone processing unit 305. In this case, a one-dimensional downward-sloping look-up table 2401 shown in FIG. 24 has been set in the density correction unit 416 of the smoothing determination unit 303. Specifically, a case is shown in which settings are made such that the density of edges to which the second smoothing processing is to be applied is reduced in advance. Reference numeral 2500 denotes a pixel that has been converted into a lighter color than the pixels 2301 as a result of application of the one-dimensional downward-sloping look-up table in the density correction unit 416 of the smoothing determination unit 303.

Figure 25B:
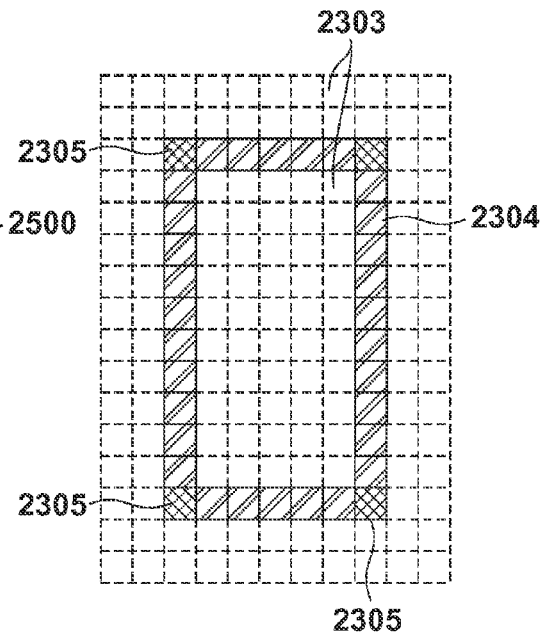

FIG. 25B shows correction switching data to be input to the halftone processing unit 305, the data being the same as that in FIG. 23B.

Figure 25C:
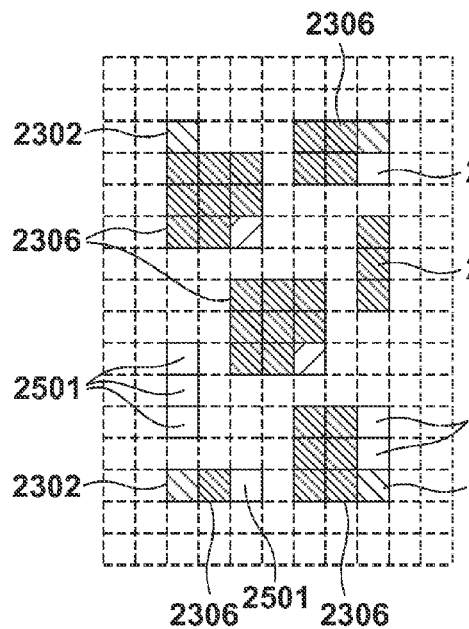

FIG. 25C shows screen data to be generated by the halftone processing unit 305 in step S2003, S2005, or S2006. Reference numeral 2501 denotes a pixel that has not been converted into a halftone dot even with the application of a low screen ruling because that pixel has been converted into a lighter color than the pixels 2301 as a result of application of the one-dimensional downward-sloping look-up table in the density correction unit 416 of the smoothing determination unit 303.

Figure 25D:
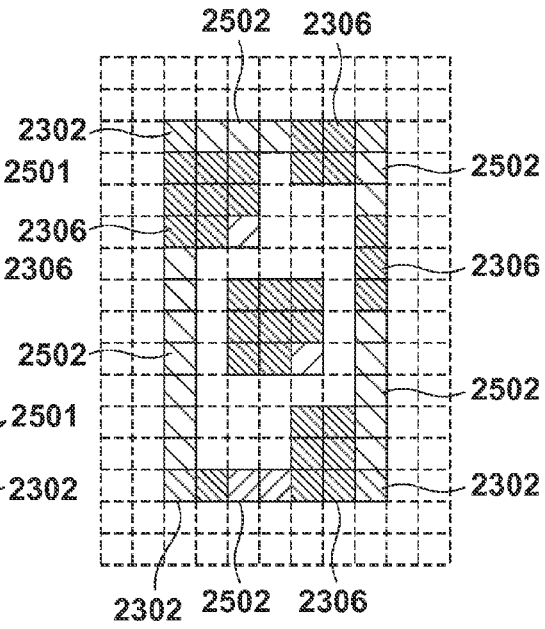

FIG. 25D shows image data to be output from the halftone processing unit 305. The image data is obtained by comparing, for each pixel whose smoothing type in the correction switching data is "second smoothing processing", the value in the smoothed data and the value in the screen data in FIG. 25C, and outputting the greater value. Reference numeral 2502 denotes a pixel for which the smoothed data is output because the value in the smoothed data is greater than the value in the screen data.

As described above, if the density correction is not performed by the density correction unit 416 of the smoothing determination unit 303, the density of edges to which the second smoothing processing has been applied simply increases because of the addition of the smoothed data.

In contrast, in the present embodiment, pixels that are not to be converted into halftone dots, like the pixels 2501 in FIG. 25C, are created by detecting edges to which the second smoothing processing is to be applied, prior to the halftone processing and performing the density correction so as to reduce the density of the edges by the amount by which the density of the edges will increase.

Accordingly, although the smoothed data is added to edges to which the second smoothing processing is to be applied, it is possible to suppress an increase in the density of the edges and to reduce jaggies on the edges due to screen processing.

Variation

A variation differs from the above-described embodiment only in part of the configuration of the smoothing determination unit 303 shown in FIG. 4. Therefore, constituent elements that are the same as in the above-described embodiment have been given the same reference numerals, and the following description focuses on differences from the above-described embodiment.

First, the operation of the smoothing determination unit 303 according to the variation will be described with reference to FIG. 4. Note that in the variation, constituent elements other than the density correction unit 416 are the same as those described in the above embodiment, and thus detailed descriptions thereof have been omitted.

The density correction unit 416 performs density correction processing on the pixel of interest in the center of the reference area output from the FIFO memory 401, and outputs the corrected pixel of interest to the edge correction unit 417. The density correction processing is processing for obtaining the corrected pixel of interest by multiplying the value of the pixel of interest by a predetermined density correction value, the density correction value being given from 0 to 1.

Note that although the density correction unit 416 obtains the corrected pixel of interest by multiplying the input pixel of interest by the density correction value in the description of the present embodiment, the present invention is not limited thereto. For example, the density correction processing may be performed by subtracting the density correction value from the value of the pixel of interest. In this case, a value up to 255 is given as the density correction value. There are cases where a negative value is obtained as a result of the subtraction of the density correction value from the value of the pixel of interest, but in this case, the corrected value of the pixel of interest may be clipped to zero.

According to the variation, since one-dimensional look-up tables are not used in the density correction processing, there is no need to store one-dimensional look-up tables in the RAM or the like. This enables the density correction processing to be performed at low cost.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-276388, filed Dec. 10, 2010, which is hereby incorporated by reference herein in its entirety.

What is claimed is:

1. An image forming apparatus comprising:
   a determination unit configured to determine whether or not to perform smoothing processing to a pixel of image data;
   a correction unit configured to reduce a value of a pixel to which the determination unit determines the smoothing processing is to be performed;
   a screen processing unit configured to generate screen data by performing screen processing to the pixel corrected by the correction unit; and
   a smoothing processing unit configured to perform the smoothing processing to the pixel to which the determination unit determines the smoothing processing is to be performed by comparing a value of the generated screen data and a value generated from the pixel value after correction by the correction unit, and outputting data having a greater value.

2. The apparatus according to claim 1, further comprising a gamma correction unit configured to perform gamma correction for the pixel corrected by the correction unit.

3. The apparatus according to claim 1, wherein the smoothing processing unit performs the second smoothing processing by comparing a value of the generated screen data and a value generated from the value of the pixel after correction by the correction unit, and outputting data having a greater value.

4. The apparatus according to claim 1, wherein the correction unit reduces the value of the pixel using a one-dimensional look-up table.

5. An image forming method comprising:
   a determination step of determining whether or not to perform smoothing processing to a pixel of image data;
   a correction step of reducing a value of a pixel to which the determination step determines the smoothing processing is to be performed;
   a screen processing step of generating screen data by performing screen processing to the pixel corrected in the correction step; and
   a smoothing processing step of performing the smoothing processing to the pixel to which the determination step determines the smoothing processing is to be performed by comparing a value of the generated screen data and a value generated from the pixel value after correction in the correction step, and outputting data having a greater value.

6. A non-transitory computer-readable recording medium storing a program for causing a computer to execute an image forming method, the image forming method comprising:
   a determination step of determining whether or not to perform smoothing processing to a pixel of image data;
   a correction step of reducing a value of a pixel to which the determination step determines the smoothing processing is to be performed;
   a screen processing step of generating screen data by performing screen processing to the pixel corrected in the correction step; and
   a smoothing processing step of performing the smoothing processing to the pixel to which the determination step determines the smoothing processing is to be performed by comparing a value of the generated screen data and a value generated from the pixel value after correction in the correction step, and outputting data having a greater value.

7. An image forming apparatus comprising:
   a first determination unit configured to determine whether or not to perform a first smoothing processing to each pixel of image data;

a second determination unit configured to determine whether or not to perform a second smoothing processing to a pixel to which the first determination unit determines the first smoothing processing is not to be performed;

a correction unit configured to reduce a value of a pixel to which the second determination unit determines the second smoothing processing is to be performed;

a screen processing unit configured to generate screen data by performing screen processing to the pixel corrected by the correction unit;

a smoothing processing unit configured to perform the second smoothing processing to the pixel to which the second determination unit determines the second smoothing processing is to be performed, based on the generated screen data and a value of the pixel after correction by the correction unit;

a control unit configured to control so as not to perform processing by the correction unit and the screen processing unit to a pixel to which the first determination unit determines the first smoothing processing is to be performed.

8. An image forming method comprising:

a first determination step of determining whether or not to perform a first smoothing processing to each pixel of image data;

a second determination step of determining whether or not to perform a second smoothing processing to a pixel to which the first determination step determines the first smoothing processing is not to be performed;

a correction step of reducing a value of a pixel to which the second determination step determines the second smoothing processing is to be performed;

a screen processing step of generating screen data by performing screen processing to the pixel corrected by the correction step;

a smoothing processing step of performing the second smoothing processing to the pixel to which the second determination step determines the second smoothing processing is to be performed, based on the generated screen data and a value of the pixel after correction by the correction step;

a control step of controlling so as not to perform processing by the correction step and the screen processing step to a pixel to which the first determination step determines the first smoothing processing is to be performed.

\* \* \* \* \*